(12) United States Patent
Biderman et al.

(10) Patent No.: US 8,007,847 B2
(45) Date of Patent: Aug. 30, 2011

(54) FEEDING FORMULA APPLIANCE

(75) Inventors: Eytan Biderman, Tel Aviv (IL); Noam Ziv, Tel Aviv (IL)

(73) Assignee: Eytan Biderman, Tel-Aviv (IL)

( * ) Notice: Subject to any disclaimer, the term of this patent is extended or adjusted under 35 U.S.C. 154(b) by 994 days.

(21) Appl. No.: 11/499,690

(22) Filed: Aug. 7, 2006

(65) Prior Publication Data

US 2006/0278093 A1    Dec. 14, 2006

Related U.S. Application Data

(63) Continuation-in-part of application No. 10/755,289, filed on Jan. 13, 2004, now Pat. No. 7,104,184.

(51) Int. Cl.
A23L 2/52 (2006.01)

(52) U.S. Cl. ........ 426/231; 426/590; 426/519; 426/521; 426/801

(58) Field of Classification Search .......... 426/231–233, 426/87, 590, 392, 394, 506, 519–523, 800–801; 99/323.3, 282, 283, 290, 299, 357; 221/1, 221/9
See application file for complete search history.

(56) References Cited

U.S. PATENT DOCUMENTS

| | | | |
|---|---|---|---|
| 636,013 A | 10/1899 | Tolle | |
| 862,867 A | 8/1907 | Eggleston | |
| 2,700,876 A | 2/1955 | Gagnan | |
| 3,100,434 A | 8/1963 | Bunn | |
| 3,218,175 A | 11/1965 | Siegel et al. | |
| 3,266,492 A | 8/1966 | Steinberg | |
| 3,352,460 A | 11/1967 | Herring | |
| 3,524,714 A | 8/1970 | Grove et al. | |
| 3,634,107 A | 1/1972 | Cornelius | |
| 3,664,344 A | 5/1972 | Bryne | |
| 3,791,932 A | 2/1974 | Schuurs et al. | |
| 3,839,153 A | 10/1974 | Schuurs et al. | |
| 3,850,578 A | 11/1974 | McConnell | |
| 3,850,752 A | 11/1974 | Schuurs et al. | |
| 3,853,987 A | 12/1974 | Dreyer | |
| 3,864,060 A | 2/1975 | Hall et al. | |
| 3,867,517 A | 2/1975 | Ling | |
| 3,879,262 A | 4/1975 | Schuurs et al. | |
| 3,901,654 A | 8/1975 | Gross | |
| 3,935,074 A | 1/1976 | Rubenstein et al. | |

(Continued)

FOREIGN PATENT DOCUMENTS

CH          456885          5/1968

(Continued)

OTHER PUBLICATIONS

Anguiano et al. "Protofibrillar Islet Amyloid Polypeptide Permeabilizes Synthetic Vesicles by A Pore-Like Mechanism That May Be Relevant to Type II Diabetes", Biochemistry, 41: 11338-11343, 2002.

(Continued)

*Primary Examiner* — Drew E Becker

(57) ABSTRACT

A device for preparing a fluid food at a desired consumption temperature on demand, comprising two reservoirs of water, a container containing a formula, a data processor and a controller for dispensing water of the correct temperature from each of the reservoirs and the formula from the container into a vessel. Also provided are methods for preparing specialized foods at desired consumption temperatures on demand, and methods for marketing both foods and food-preparation devices.

14 Claims, 7 Drawing Sheets

U.S. PATENT DOCUMENTS

| | | |
|---|---|---|
| 3,963,377 A | 6/1976 | Elliott et al. |
| 3,984,533 A | 10/1976 | Uzgiris |
| 3,996,345 A | 12/1976 | Ullman et al. |
| 4,034,074 A | 7/1977 | Miles |
| 4,098,876 A | 7/1978 | Piasio et al. |
| 4,515,516 A | 5/1985 | Perrine et al. |
| 4,626,540 A | 12/1986 | Capps et al. |
| 4,651,862 A | 3/1987 | Greenfield |
| 4,666,828 A | 5/1987 | Gusella |
| 4,673,415 A | 6/1987 | Stanford |
| 4,683,202 A | 7/1987 | Mullis |
| 4,750,869 A | 6/1988 | Shipman, III |
| 4,753,370 A | 6/1988 | Rudick |
| 4,801,531 A | 1/1989 | Frossard |
| 4,873,316 A | 10/1989 | Meade et al. |
| 4,879,219 A | 11/1989 | Wands et al. |
| 4,970,233 A | 11/1990 | McHugh |
| 4,993,593 A | 2/1991 | Fabiano |
| 5,011,771 A | 4/1991 | Bellet et al. |
| 5,133,360 A | 7/1992 | Spears |
| 5,192,659 A | 3/1993 | Simons |
| 5,224,930 A | 7/1993 | Spaeth et al. |
| 5,259,366 A | 11/1993 | Reydel et al. |
| 5,260,795 A | 11/1993 | Sakai et al. |
| 5,272,057 A | 12/1993 | Smulson et al. |
| 5,281,521 A | 1/1994 | Trojanowski et al. |
| 5,421,323 A | 6/1995 | Herrmann et al. |
| 5,445,287 A * | 8/1995 | Center et al. ............... 221/1 |
| 5,498,757 A * | 3/1996 | Johnson et al. ............. 426/520 |
| 5,540,062 A | 7/1996 | Maytal |
| 5,556,744 A | 9/1996 | Weiner et al. |
| 5,570,816 A * | 11/1996 | LaBarbera, Jr. ............ 222/129.4 |
| 5,584,070 A | 12/1996 | Harris et al. |
| 5,647,868 A | 7/1997 | Chinn |
| 5,659,041 A | 8/1997 | Pollak et al. |
| 5,666,159 A | 9/1997 | Parulski et al. |
| 5,688,561 A | 11/1997 | Ichikawa et al. |
| 5,716,353 A | 2/1998 | Matsuura et al. |
| 5,722,418 A * | 3/1998 | Bro .............................. 600/545 |
| 5,729,289 A | 3/1998 | Etoh |
| 5,735,847 A | 4/1998 | Gough et al. |
| 5,746,736 A | 5/1998 | Tankovich et al. |
| 5,759,182 A | 6/1998 | Varney et al. |
| 5,778,189 A | 7/1998 | Kimura et al. |
| 5,797,313 A | 8/1998 | Rothley |
| 5,800,379 A | 9/1998 | Edwards |
| 5,800,484 A | 9/1998 | Gough et al. |
| 5,800,487 A | 9/1998 | Mikus et al. |
| 5,807,083 A | 9/1998 | Tomoiu |
| 5,808,276 A | 9/1998 | Padilla |
| 5,817,231 A * | 10/1998 | Souza ........................ 210/96.2 |
| 5,846,181 A | 12/1998 | Heckele et al. |
| 5,853,368 A | 12/1998 | Solomon et al. |
| 5,858,437 A | 1/1999 | Anson |
| 5,880,731 A | 3/1999 | Liles et al. |
| 5,899,897 A | 5/1999 | Rabin et al. |
| 5,902,299 A | 5/1999 | Jayaraman |
| 5,916,212 A | 6/1999 | Baust et al. |
| 5,964,796 A | 10/1999 | Imran |
| 5,975,365 A | 11/1999 | Hsieh |
| 5,978,697 A | 11/1999 | Maytal et al. |
| 5,993,172 A | 11/1999 | Schuman et al. |
| 5,993,444 A | 11/1999 | Ammar et al. |
| 5,993,471 A | 11/1999 | Riza et al. |
| 5,999,541 A | 12/1999 | Hinchey et al. |
| 6,004,273 A | 12/1999 | Sakamoto et al. |
| 6,009,877 A | 1/2000 | Edwards |
| 6,022,222 A | 2/2000 | Guinan |
| 6,027,497 A | 2/2000 | Daniel et al. |
| 6,039,730 A | 3/2000 | Rabin et al. |
| 6,053,937 A | 4/2000 | Edwards et al. |
| 6,104,430 A | 8/2000 | Fukuoka |
| 6,106,518 A | 8/2000 | Wittenberger et al. |
| 6,118,933 A | 9/2000 | Roberson |
| 6,126,654 A | 10/2000 | Giba et al. |
| 6,129,670 A | 10/2000 | Burdette et al. |
| 6,139,544 A | 10/2000 | Mikus et al. |
| 6,142,991 A | 11/2000 | Schatzberger |
| 6,148,717 A | 11/2000 | Lassota |
| 6,152,894 A | 11/2000 | Kubler |
| 6,167,441 A | 12/2000 | Himmel |
| 6,173,117 B1 | 1/2001 | Clubb |
| 6,179,831 B1 | 1/2001 | Bliweis |
| 6,188,431 B1 | 2/2001 | Oie |
| 6,190,378 B1 | 2/2001 | Jarvinen |
| 6,206,832 B1 | 3/2001 | Downey et al. |
| 6,231,570 B1 | 5/2001 | Tu et al. |
| 6,240,829 B1 | 6/2001 | McGarrah |
| 6,253,028 B1 | 6/2001 | Roberson |
| 6,256,542 B1 | 7/2001 | Marshall et al. |
| 6,261,569 B1 | 7/2001 | Comis et al. |
| 6,264,679 B1 | 7/2001 | Keller et al. |
| 6,270,494 B1 | 8/2001 | Kovalcheck et al. |
| 6,287,326 B1 | 9/2001 | Pecor |
| 6,303,567 B1 | 10/2001 | Findeis et al. |
| 6,306,129 B1 | 10/2001 | Little et al. |
| 6,315,713 B1 | 11/2001 | Takada |
| 6,330,478 B1 | 12/2001 | Lee et al. |
| 6,359,112 B2 | 3/2002 | Kapurniotu et al. |
| 6,383,144 B1 | 5/2002 | Mooney et al. |
| 6,383,181 B1 | 5/2002 | Johnston et al. |
| 6,400,729 B1 | 6/2002 | Shimadoi et al. |
| 6,412,527 B1 | 7/2002 | Brice |
| 6,419,462 B1 | 7/2002 | Horie et al. |
| 6,427,078 B1 | 7/2002 | Wilska et al. |
| 6,453,799 B1 * | 9/2002 | Kown ........................ 99/286 |
| 6,460,735 B1 * | 10/2002 | Greenwald et al. ........ 222/146.1 |
| 6,468,268 B1 | 10/2002 | Assoud et al. |
| 6,505,629 B1 | 1/2003 | Mikus et al. |
| 6,556,240 B2 | 4/2003 | Oka et al. |
| 6,593,339 B1 | 7/2003 | Eek et al. |
| 6,610,478 B1 | 8/2003 | Takle et al. |
| 6,612,224 B2 | 9/2003 | Mercier et al. |
| 6,613,044 B2 | 9/2003 | Carl |
| 6,617,114 B1 | 9/2003 | Fowlkes et al. |
| 6,652,515 B1 | 11/2003 | Maguire et al. |
| 6,654,725 B1 | 11/2003 | Langheinrich et al. |
| 6,657,654 B2 | 12/2003 | Narayanaswami |
| 6,677,153 B2 | 1/2004 | Iversen |
| 6,689,753 B1 | 2/2004 | Soto-Jara |
| 6,706,037 B2 | 3/2004 | Zvuloni et al. |
| 6,751,525 B1 * | 6/2004 | Crisp, III .................... 700/241 |
| 6,759,072 B1 * | 7/2004 | Gutwein et al. ............. 426/433 |
| 6,770,070 B1 | 8/2004 | Balbierz |
| 6,809,759 B1 | 10/2004 | Chiang |
| 6,810,149 B1 | 10/2004 | Squilla et al. |
| 6,811,492 B1 | 11/2004 | Arakawa et al. |
| 6,825,875 B1 | 11/2004 | Strub et al. |
| 6,864,911 B1 | 3/2005 | Zhang et al. |
| 6,915,119 B1 | 7/2005 | Konishi |
| 7,035,387 B2 | 4/2006 | Russell et al. |
| 7,052,396 B2 | 5/2006 | Comair |
| 7,104,184 B2 * | 9/2006 | Biderman et al. ............. 99/282 |
| 7,147,131 B2 * | 12/2006 | Sher et al. ........................ 222/1 |
| 7,150,743 B2 | 12/2006 | Zvuloni et al. |
| 2001/0049283 A1 | 12/2001 | Thomas |
| 2001/0050914 A1 | 12/2001 | Akahane et al. |
| 2002/0001295 A1 | 1/2002 | Park |
| 2002/0032582 A1 * | 3/2002 | Feeney et al. ...................... 705/2 |
| 2002/0040229 A1 | 4/2002 | Zvuloni et al. |
| 2002/0049436 A1 | 4/2002 | Zvuloni et al. |
| 2002/0065088 A1 | 5/2002 | Seignol et al. |
| 2002/0152896 A1 * | 10/2002 | Young et al. .................... 99/330 |
| 2002/0188287 A1 | 12/2002 | Zvuloni et al. |
| 2003/0025802 A1 | 2/2003 | Mayer, Jr. et al. |
| 2003/0032896 A1 | 2/2003 | Bosley, Jr. et al. |
| 2003/0032936 A1 | 2/2003 | Lederman |
| 2003/0060820 A1 | 3/2003 | Maguire et al. |
| 2003/0084121 A1 | 5/2003 | De Boor et al. |
| 2003/0130484 A1 | 7/2003 | Gordon et al. |
| 2003/0174242 A1 | 9/2003 | Carmi et al. |
| 2003/0181896 A1 | 9/2003 | Zvuloni et al. |
| 2003/0225155 A1 | 12/2003 | Fernandez-Pol et al. |
| 2004/0015547 A1 | 1/2004 | Griffin et al. |
| 2004/0049177 A1 | 3/2004 | Zvuloni et al. |
| 2004/0052928 A1 | 3/2004 | Gazit |
| 2004/0059328 A1 | 3/2004 | Daniel et al. |

| | | | |
|---|---|---|---|
| 2004/0138656 A1 | 7/2004 | Francischelli et al. | |
| 2004/0143252 A1 | 7/2004 | Hurst | |
| 2004/0192312 A1 | 9/2004 | Li et al. | |
| 2004/0204705 A1 | 10/2004 | Lafontaine | |
| 2004/0267248 A1 | 12/2004 | Duong et al. | |
| 2005/0020809 A1 | 1/2005 | Gazit | |
| 2005/0085691 A1 | 4/2005 | Nakao | |
| 2005/0101338 A1 | 5/2005 | Kraft | |
| 2005/0150393 A1 | 7/2005 | Biderman et al. | |
| 2005/0192078 A1 | 9/2005 | Jawaharlal | |
| 2005/0224085 A1 | 10/2005 | Zvuloni | |
| 2005/0251124 A1 | 11/2005 | Zvuloni et al. | |
| 2006/0115572 A1* | 6/2006 | Guerrero et al. | 426/597 |
| 2006/0150821 A1* | 7/2006 | Paul et al. | 99/279 |
| 2006/0157463 A1 | 7/2006 | Wiele et al. | |
| 2006/0234947 A1 | 10/2006 | Gazit | |
| 2006/0282503 A1 | 12/2006 | Gwozdz | |
| 2007/0021345 A1 | 1/2007 | Gazit | |
| 2007/0088247 A1 | 4/2007 | Bliweis et al. | |
| 2007/0135334 A1 | 6/2007 | Gazit | |
| 2007/0138007 A1 | 6/2007 | Yemini et al. | |
| 2007/0167938 A1 | 7/2007 | Zvuloni et al. | |
| 2008/0045934 A1 | 2/2008 | Schechter et al. | |
| 2008/0051774 A1 | 2/2008 | Ofir et al. | |
| 2008/0051776 A1 | 2/2008 | Bliweis et al. | |
| 2008/0082678 A1 | 4/2008 | Lorch et al. | |
| 2008/0216022 A1 | 9/2008 | Lorch | |
| 2008/0300586 A1 | 12/2008 | Zvuloni | |
| 2009/0013087 A1 | 1/2009 | Lorch et al. | |
| 2009/0156471 A1 | 6/2009 | Gazit et al. | |
| 2009/0183637 A1* | 7/2009 | Nijboer et al. | 99/275 |
| 2010/0112152 A1* | 5/2010 | Sinnema et al. | 426/248 |

FOREIGN PATENT DOCUMENTS

| | | |
|---|---|---|
| DE | 2332513 | 1/1975 |
| DE | 3412445 | 10/1985 |
| DE | 3511159 | 10/1986 |
| DE | 19540731 | 5/1997 |
| DE | 10024660 | 11/2000 |
| DE | 10043282 | 3/2002 |
| DE | 10321094 | 11/2004 |
| EP | 0081122 | 6/1983 |
| EP | 0264166 | 4/1988 |
| EP | 0608927 | 8/1994 |
| EP | 0624347 | 11/1994 |
| EP | 0650125 | 4/1995 |
| EP | 0651308 | 5/1995 |
| EP | 0472361 | 4/1996 |
| EP | 0771096 | 5/1997 |
| EP | 0869464 | 7/1998 |
| EP | 0885904 | 12/1998 |
| EP | 0947172 | 10/1999 |
| EP | 0975132 | 1/2000 |
| EP | 1048272 | 11/2000 |
| GB | 2019813 | 7/1979 |
| GB | 2289555 | 11/1995 |
| GB | 2405602 | 3/2005 |
| JP | 59-044313 | 3/1984 |
| JP | 60-040061 | 3/1985 |
| JP | 63-044895 | 2/1988 |
| JP | 02-295923 | 12/1990 |
| JP | 07-110175 | 4/1995 |
| JP | 07-127939 | 5/1995 |
| JP | 2000-193661 | 7/2000 |
| JP | 2001-504334 | 4/2001 |
| WO | WO 92/19253 | 11/1992 |
| WO | WO 95/08999 | 4/1995 |
| WO | WO 96/28471 | 9/1996 |
| WO | WO 96/37158 | 11/1996 |
| WO | WO 96/39834 | 12/1996 |
| WO | WO 97/16191 | 5/1997 |
| WO | WO 97/47224 | 12/1997 |
| WO | WO 98/00341 | 1/1998 |
| WO | WO 98/14111 | 4/1998 |
| WO | WO 98/20135 | 5/1998 |
| WO | WO 98/52480 | 11/1998 |
| WO | WO 99/04211 | 1/1999 |
| WO | WO 99/56639 | 11/1999 |
| WO | WO 99/63881 | 12/1999 |
| WO | WO 00/22996 | 4/2000 |
| WO | WO 01/10457 | 2/2001 |
| WO | WO 01/21188 | 3/2001 |
| WO | WO 01/34631 | 5/2001 |
| WO | WO 01/45726 | 6/2001 |
| WO | WO 01/93836 | 12/2001 |
| WO | WO 02/34106 | 5/2002 |
| WO | WO 03/063760 | 8/2003 |
| WO | WO 03/077866 | 9/2003 |
| WO | WO 03/084377 | 10/2003 |
| WO | WO 2004/043272 | 5/2004 |
| WO | WO 2005/018428 | 3/2005 |
| WO | WO 2005/067385 | 7/2005 |
| WO | WO 2005/081552 | 9/2005 |
| WO | WO 2006/006172 | 1/2006 |
| WO | WO 2006/075334 | 7/2006 |
| WO | WO 2006/075335 | 7/2006 |
| WO | WO 2007/043046 | 4/2007 |
| WO | WO 2007/069248 | 6/2007 |
| WO | WO 2007/080557 | 7/2007 |
| WO | WO 2007/080558 | 7/2007 |
| WO | WO 2007/080559 | 7/2007 |
| WO | WO 2007/086056 | 8/2007 |
| WO | WO 2008/018066 | 2/2008 |

OTHER PUBLICATIONS

Arvinte et al. "The Structure and Mechanism of Formation of Human Calcitonin Fibrils", The Journal of Biological Chemistry, 268(9): 6415-6422, 1993.

Austin et al. "Medical Progress: Calcitonin. Physiology and Pathophysiology", The New England Journal of Medicine, 304(5): 269-278, 1981.

Ausubel et al. Current Protocols in Molecular Biology, 1(Suppl.63).

Balbach et al. "Supramolecular Structure in Full-Length Alzheimer's β-Amyloid Fibrils: Evidence for A Parallel β-Sheet Organization From Solid-State Nuclear Magnetic Resonance", Biophysical Journal, 83: 1205-1216, 2002.

Baltzer et al. "De Novo Design of Proteins—What Are the Rules?", Chemical Reviews, 101(10): 3153-3163, 2001.

Banerji et al. "A Lymphocyte-Specific Cellular Enhancer Is Located Downstream of the Joining Region in Immunoglobulin Heavy Chain Genes", Cell, 33: 729-740, 1983.

Bauer et al. "Interfacial Adsorption and Aggregation Associated Changes in Secondary Structure of Human Calcitonin Monitored by ATR-FTIR Spectroscopy", Biochemistry, 33: 12276-12282, 1994.

Benvenga et al. "Homology of Calcitonin With the Amyloid-Related Proteins", Journal of Endocrinological Investigation, 17: 119-122, 1994.

Berger et al. "Calcitonin-Like Immunoreactivity of Amyloid Fibrils in Medullary Thyroid Carcinomas", Virchows Archiv A Pathological Anatomy and Histopathology, 412: 543-551, 1988.

Bird et al. "Single-Chain Antigen-Binding Proteins", Science, 242(4877): 423-426, 1988.

Boerner et al. "Production of Antigen-Specific Human Monoclonal Antibodies From In Vitro-Primed Human Splenocytes", The Journal of Immunology, 147(1): 86-95, 1991.

Booth et al. "Instability, Unfolding and Aggregation of Human Lysozyme Variants Underlying Amyloid Fibrillogenesis", Nature, 385: 787-793, 1997.

Bursavich et al. "Designing Non-Peptide Peptidomimetics in the 21st Century: Inhibitors Targeting Comformational Ensembles", Journal of Medical Chemistry, 45(3): 541-558, 2002.

Byrne et al. "Mutiplex Gene Regulation: A Two-Tiered Approach to Transgene Regulation in Transgenic Mice", Proc. Natl. Acad. Sci. USA, 86: 5473-5477, 1989.

Calame et al. "Transcriptional Controlling Elements in the Immunoglobulin and T Cell Receptor Loci", Advances in Immunology, 43: 235-275, 1988.

Cherny et al. "The Formation of *Escherichia coli* Curli Amyloid Fibrils is Mediated by Prion-Like Peptide Repeats", Journal of Molecular Biology, 352(2): 245-252, 2005.

Chopin et al. "Analysis of Six Prophages in *Lactococcus lactis* IL1403: Different Genetic Structure of Temperate and Virulent Phage Populations", Nucleic Acids Research, 29(3): 644-651, 2001.

Choplin "Computers and the Medicinal Chemist", Comprehensive Medicinal Chemistry, 4(Chap.17.2): 33-58, 1990.

Chou et al. "Conformational Parameters for Amino Acids in Helical, β-Sheet, and Random Coil Regions Calculated From Proteins", Biochemistry, 13(2): 211-222, 1974.

Claessens et al. "Review Commentary: π-π Interactions in Self-Assembly", Journal of Physical Organic Chemistry, 10: 254-272, 1997.

Cole et al. "Human Monoclonal Antibodies", Molecular &. Cellular Biochemistry, 62(2): 109-120, 1984.

Cole et al. "The EBV-Hybridoma Technique and Its Application to Human Lung Cancer", Monoclonal Antibodies and Cancer Therapy, Proceedings of the Roche-UCLA Symposium, Park City, Utah, p. 77-96, 1985.

Cooper "Selective Amyloid Staining As A Function of Amyloid Composition and Structure. Histochemical Analysis of the Alkaline Congo Red. Standardized Toluidine Blue, and Iodine Methods", Laboratory Investigation, 31(3): 232-238, 1974.

Copp "Endocrine Regulation of Calcium Metabolism", Annual Reviews in Physiology, 32: 61-86, 1970.

Cote et al. "Generation of Human Monoclonal Antibodies Reactive With Cellular Antigens", Proc. Natl. Acad. Sci. USA, 80: 2026-2030, 1983.

Coughlan et al. "Factors Influencing the Processing and Function of the Amyloid Beta Precursor Protein—A Potential Therapeutic Target in Alzheimer's Disease?", Pharmacology and Therapeutics, 86: 111-144, 2000.

Damas et al. "Review: TTR Amyloidosis—Structural Features Leading to Protein Aggregation and Their Implications on Therapeutic Strategies", Journal of Structural Biology, 130: 290-299, 2000.

Edlund et al. "Cell-Specific Expression of the Rat Insuline Gene: Evidence for Role of Two Distinct 5' Flanking Elements", Science, 230(4278): 912-916, 1985.

Ferrannini "Insulin Resistance Versus Insulin Deficiency in Non-Insulin-Dependent Diabetes Mellitus: Problems and Prospects", Endocrine Reviews, 19(4): 477-490, 1998.

Findeis "Approaches to Discovery and Characterization of Inhibitors of Amyloid Beta-Peptide Polymerization", Biochimica et Biophysica Acta, 1502: 76-84, 2000.

Findeis et al. "Modified-Peptide Inhibitors of Amyloid β-Peptide Polymerization", Biochemistry, 38: 6791-6800, 1999.

Fingl et al. "Inroduction: General Principles", The Pharmacological Basis of Therapeutics, 5th Ed., Sec.I(Chap.1): 1-53, 1975.

Fishwild et al. "High-Avidity Hum IgGκ Monoclonal Antibodies From A Novel Strain of Minilocus Transgenic Mice", Nature Biotechnology, 14: 845-851, 1996.

Forloni et al. "Anti-Amyloidogenic Activity of Tetracyclines: Studies in Vitro", FEBS Letters, 487(3): 404-407, 2001. Figs. 1,3.

Freshney "Animal Cell Culture—A Practical Approach", IRL Press.

Friedman "Chemistry, Nutrition, and Microbiology of D-Amino Acids", Journal of Agriculture and Food Chemistry, 47(9): 3457-3479, 1999.

Gait "Oligonucleotide Synthesis—A Practical Approach", IRL Press.

Gajdusek "Unconventional Viruses and the Origin and Disappearance of Kuru", Science, 197(4307): 943-960, 1977.

Gazit "A Possible Role for 'Phi'-Stacking in the Self-Assembly of Amyloid Fibrils", The FASEB Journal, 16: 77-83, 2002.

Gazit "Global Analysis of Tandem Aromatic Optapeptide Repeats: The Significance of the Aroma-Glycine Motif", Bioinformatics Discovery Note, 18(6): 880-883, 2002.

Gazit "The 'Correctly Folded' State of Proteins: Is it a Metastable State?", Angewandte Chemie, International Edition, 41(2): 257-259, 2002.

Gillard et al. "Controlling Self-Assembly", Chemical European Journal, 3(12): 1933-1940, 1997.

Gillmore et al. "Amyloidosis a Review of Recent Diagnostic and Therapeutic Developments", British Journal of Haematology, 99: 245-256, 1997.

Glenner "Amyloid Deposits and Amyloidosis. The Beta-Fibrilloses (First of Two Parts)", The New England Journal of Medicine, 302(23): 1283-1292, 1980.

Gorman et al. "Alzheimer Beta-Amyloid Peptides, Structures of Amyloid Fibrils and Alternate Aggregation Products", Biopolymers, 60: 381-394, 2001. Claims 1-16, 22-26, 70-80, 91-100.

Grateau "Le Curli du Coli: Une Variété Physiologique d'Amilose [Coli's Curli or How Amyloid Can be Physiological]", Medecine Sciences, 18(6-7): p. 664, 2002.

Häggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.

Han et al. "Technetium Complexes for the Quantitation of Brain Amyloid", Journal of the American Chemical Society, 118: 4506-4507, 1996.

Harlow et al. "Antibodies: A Laboratory Manual", Cold Spring Harbor Laboratory, p. III-IX, 1988.

Harrison et al. "Amyloid Peptides and Proteins in Review", Reviews in Physiology, Biochemistry and Pharmacology, 159: 1-77, 2007.

Hayden et al. "'A' Is for Amylin and Amyloid in Type 2 Diabetes Mellitus", JOP Journal of the Pancreas (Online), 2(4): 124-139, 2001.

Hoeppener et al. "The Complete Islet Amyloid Polypeptide Precursor Is Encoded by Two Exons", Biochemical & Biophysical Research Communications, 189: 1569-1577, 1993. Database, Accession No. S04016, 1993. Claims 1-16, 22-26.

Hoogenboom et al. "By-Passing Immunisation. Human Antibodies From Synthetic Repertoires of Germline $V_H$ Gene Segments Rearranged In Vitro", Journal of Molecular Biology, 227: 381-388, 1992.

Höppener et al. "Islet Amyloid and Type 2 Diabetes Mellitus", The New England Journal of Medicine, 343(6): 411-419, 2000.

Inbar et al. "Localization of Antibody-Combining Sites Within the Variable Portions of Heavy and Light Chains", Proc. Natl. Acad. Sci. USA, 69(9): 2659-2662, 1972.

Inglot "Comparison of the Antiviral Activity In Vitro of Some Non-Steroidal Anti-Inflammatory Drugs", Journal of General Virology, 4(2): 203-214, 1969.

Inouye et al "Synthesis and Biological Properties of the 10-Substituted Analogues of ACTH-(1-18)-NH2", Shionogi Research Laboratory, Fukushima-Ku, Osaka, p. 177-182, 1978.

Jelokhani-Niaraki et al "Changes in Conformation and Antimicrobial Properties Caused by Replacement of D-Amino Acids With α-Aminoisobutyric Acid in the Gramicidin Backbbone: Synthesis and Circular Dichroic Studies", Journal of the Chemical Society Perkin Transactions, 2: 1 187-1193, 1992.

Johnson et al. "Islet Amyloid, Islet-Amiloid Polypeptide, and Diabetes Mellitus", The New England Journal of Medicine, 321(8): 513-518, 1989. IDS in 45786.

Jones et al. "Replacing the Complementarity-Determining Regions in A Human Antibody With Those From A Mouse", Nature, 321: 522-525, 1986.

Kahn et al. "Islet Amyloid: A Long-Recognized But Underappreciated Pathological Feature of Type 2 Diabetes", Diabetes, 48: 241-253, 1999.

Kamihira et al. "Conformational Transitions and Fibrillation Mechanism of Human Calcitonin as Studied by High-Resolution Solid-State 13C NMR [in Process Citation]", Protein Science, 9: 867-877, 2000.

Kanaori et al. "Study of human Calcitonin Fibrillation by Proton Nuclear Magnetic Resonance Spectroscopy", Biochemistry, 34: 12138-12143, 1995.

Kapurniotu et al. "Structure-Based Design and Study of Non-Amyloidogenic, Double N-Methylated IAPP Amyloid Core Sequences as Inhibitors of IAPP Amyloid Formation and Cytotoxicity", Journal of Molecular Biology, 315: 339-350, 2002.

Kapurniotu et al. Database, Accession No. AAW93015, 1991.

Karle et al. "Structural Characteristics of α-Helical Peptide Molecules Contianing Aib Residues", Biochemistry, 29(29): 6747-6756, Jul. 24, 1990.

Kedar et al. "In Vitro Synthesis of 'Amyloid' Fibrils From Insulin, Calcitonin and Parathormone", Israel Journal of Medical Science, 12(10): 1137-1140, 1976.

Kilkarni et al. "Investigation of the Effect of Antisense Oligodeoxynucleotides to Islet Amyloid Polypeptide mRNA on Insulin Release, Content and Expression", Journal of Endocrinology, 151: 341-348, 1996.

Kohler et al. "Continuous Cultures of Fused Cells Secreting Antibody of Predefined Specifity", Nature, 256: 495-497. 1975.

Kozbor et al. "Specific Immunoglobulin Production and Enhanced Tumorigenicity Following Ascites Growth of Human Hybridomas", Journal of Immunological Methods, 81: 31-42, 1985.

Kuner et al. "Controlling Polmerization of Beta-Amyloid and Prion-Derived Peptides With Synthetic Smal Molecule Ligands", Journal of Biological Chemistry, 275(3): 1673-1678, 2000.

Kyte et al. "A Simple Method for Displaying the Hydropathic Character of A Protein", Journal of Molecular Biology, 157: 105-132, 1982.

Lansbury "Following Nature's Anti-Amyloid Strategy", Nature Biotechnology, 19(2): 112-113, 2001. p. 112, Left-Hand col., Paragraph 1—Middle col., Paragraph 1.

Larrick et al. "PCR Amplification of Antibody Genes", Methods: A Companion to Methods in Enzymology, 2(2): 106-110, 1991.

Lonberg et al. "Antigen-Specific Human Antibodies From Mice Comprising Four Distinct Genetic Modifications", Nature, 368(6474): 856-859, 1994.

Lonberg et al. "Human Antibodies From Transgenic Mice", International Review of Immunology, 13: 65-93, 1995.

Lowe et al. "Structure-Function Relationships for Inhibitors of β-Amyloid Toxicity Containing the Recognition Sequence KLVFF", Biochemistry, 40: 7882-7889, 2001.

Lyon et al. "Self-Assembly and Gelation of Oxidized Gluthathione in Organic Solvents", Journal of the American Chemical Society, 123: 4408-4413, 2001.

Marks et al. "By-Passing Immunization—Human Antibodies From V-Gene Libraries Displayed on Phage", Journal of Molecular Biology, 222: 581-597, 1991.

Marks et al. "By-Passing Immunization: Building High Affinity Human Antibodies by Chain Shuffling", Bio/Technology, 10: 779-783, 1992.

Marshak et al. "Strategies for Protein Purification and Charcterization, A Laboratory Course Manual", Cold Spring Harbor Laboratory Press, 1996.

Maury et al. "Creation of Amyloid Fibrils From Mutant ASN187 Gelsolin Peptides", Biochemical and Biophysical Research Communications, 183(1): 227-231, 1992.

Mazor et al. "Identification and Characterization of A Novel Molecular-Recognition and Self-Assembly Domain Within the Islet Amyloid Polypeptide", Journal of Molecular Biology, 322: 1013-1024, 2002.

McGaughey et al. "Π-Stacking Interactions", The Journal of Biological Chemistry, 273(25): 15458-15463, 1998.

Medore et al. "Fatal Familial Insomnia, A Prion Disease With a Mutation at Codon 178 of the Prion Protein Gene", The New England Journal of Medicine, 326(7): 444-449, 1992.

Merlini et al. "Intereaction of the Anthracycline 4'-Iodo-4'-Deoxydoxorubicin With Amyloid Fibrils: Inhibition of Amyloidogenesis", Proc. Natl. Acad. Sci. USA, 92: 2959-2963, 1995.

Moriatry et al. "Effects of Sequential Proline Substitutions on Amoyloid Formation by Human Amylin20-29", Biochemistry, 38: 1811-1818, 1999.

Morrison "Success in Specification", Nature, 368(6474): 812-813, 1994.

Mosmann "Rapid Colorimetric Assay for Cellular Growth and Survival: Application to Proliferation and Cytotoxicity Assays", Journal of Immunological Methods, 65: 55-63, 1983.

Mosselman et al. "Islet Amyloid Polipeptide: Identification and Chromosomal Localization of the Human Gene", FEBS Letters, 239(2): 227-232, 1988.

Mosselman et al. "The Complete Islet Amyloid Polypeptide Precursor Is Encoded by Two Exons", FEBS Letters, 247: 154-158, 1989, Database Accession No. S04016.

Mutter "Studies on the Coupling Rates in Liquid-Phase Peptide Synthesis Using Competition Experiments", International Journal of Peptide Protein Research, 13: 274-277, 1979.

Neuberger "Generating High-Avidity Human Mabs in Mice", Nature Biotechnology, 14: 826, 1996.

Novials et al. "Reduction of Islet Amylin Expression and Basal Secretion by Adenovirus-Mediated Delivery of Amylin Antisense cDNA", Pancreas, 17(2): 182-186, 1998.

Offen et al. "A Low Molecular Weight Copper Chelator Crosses the Blood-Brain Barrier and Attenuates Experimental Autoimmune Encephalomyelitis", Journal of Neurochemistry, 89: 1241-1251, 2004.

Orlandi et al. "Cloning Immunoglobulin Variable Domains for Expression by the Polymerase Chain Reaction", Proc. Natl. Acad. Sci. USA, 86: 3833-3837, 1989.

Pack et al. "Improved Bivalent Miniantibodies, With Identical Avidity as Whole Anitbodies, Produced by High Cell Density Fermentation of *Escherichia coli*", Bio/Technology, 11: 1271-1277, 1993.

Pavia et al. "Antimicrobial Activity of Nicotine Against A Spectrum of Bacterial and Fungal Pathogens", Journal of Medical Microbiology, 49(7):675-676, 2000.

Perbal "A Practical Guide to Molecular Cloning", Wiley-Interscience Publication.

Petkova et al. "A Structural Model for Alzheimer's β-Amyloid Fibrils Based on Experimental Constraints From Solid State NMR", Proc. Natl. Acad. Sci. USA, 99(26): 16742-16747, 2002.

Pettmann et al. "Morphological and Biochemical Maturation of Neurones Cultured in the Absence of Glial Cells", Nature, 281: 378-380, 1979.

Pinkert et al. "An Albumin Enhancer Located 10 Kb Upstream Functions Along With Its Promoter to Direct Efficient, Liver-Specific Expression in Transgenic Mice", Genes & Development, 1: 268-276, 1987.

Pispisa et al. "A Spectroscopic and Molecular Mechanics Investigation on A Series of AIB-Based Linear Peptides and a Peptide Template, Both Containing Tryptophan and A Nitroxide Derivative as Probes", Biopolymers, 53: 169-181, 2000.

Porter "The Hydrolysis of Rabbit γ-Globulin and Antibodies With Crystalline Papain", Biochemical Journal, 73: 119-126, 1959.

Presta "Antibody Engineering", Current Opinion in Structural Biology, 2: 593-596, 1992.

Puchtler et al. "A Review of Early Concepts of Amyloid in Context With Contemporary Chemical Literature From 1839 to 1859", The Journal of Histochemistry and Cytochemistry, 14(2): 123-134, 1966.

Reza et al "Self-Assembling Organic Nanotubes Based on a Cyclic Peptide Architecture", Nature, 366: 324-327, 1993.

Riechmann et al. "Reshaping Human Antibodies for Therapy", Nature, 332: 323-329, 1988.

Sambrook et al. "Molecular Cloning: A Laboratory Manual", 2nd Edition, Cold Spring Harbor Laboratory,1989.

Sano "Prevention of Alzheimer's Disease: Where We Stand", Current Neurology and Neuroscience Reports, 2(5): 392-399, Oct. 2002. Abstract.

Seino "S20G Mutation of the Amylin Gene Is Associated With Type II Diabetes in Japanes", Diabetologia, 44: 906-909, 2001.

Shetty et al. "Aromatic π-Stacking in Solution as Revealed Through the Aggregation of Phenylacetylene Macrocycles", Journal of the American Chemical Society, 118: 1019-1027, 1996.

Sigel-Causey et al. "Phylogeny of the Pelecaniformes: Molecular Systematics of A Privative Group", Avian Molecular Evolution and Systematics, academic Press, p. 159-171, NBCI GenBank, Accession No. AAB58518, 1997.

Sigma "Alphabetical List of Compounds: Phe-Phe, Phe-Pro, Phe-Val", Biochemicals and Reagents for Life Science Research, p. 774, 2000-2001.

Solomon et al. "Disaggregation of Alzheimer β-Amyloid by Site-Directed MAb", Proc. Natl. Acad. Sci. USA, 94: 4109-4112, 1997.

Soto et al. "Beta-Sheet Breaker Peptides Inhibit Fibrillogenesis in A Rat Brain Model of Amyloidosis: Implications for Alzheimer's Therapy", Nature Medicine, 4(7): 822-826, 1998.

Soto et al. "Inhibition of Alzheimer's Amyloidosis by Peptides That Prevent β-Sheet Conformation", Biochemical and Biophysical Research Communications, 226(3): 672-680, 1996.

Stephenson et al. "The 'Promiscuous Drug Concept' With Applications to Alzheimer's Disease", FEBS Letters, 579: 1338-1342, 2005.

Stites et al. "Tables of Content", Basic & Clinical Immunology, 8th Ed.: 12 P.

Sun et al. "Aromatic Van der Waals Clusters: Structure and Nonrigidity", Journal of Physical Chemistry, 100: 13348-13366, 1996.
Tenidis et al. "Identification of a Penta- and Hexapeptide of Islet Amyloid Polypeptide (IAPP) With Amyloidogenic and Cytotoxic Propereties", Journal of Molecular Biology, 295(4): 1055-1071, 2000.
Tjernberg et al. "Arrest of β-Amyloid Fibril Formation by A Pentapeptide Ligand", The Journal of Biological Chemistry, 271(15): 8545-8548, 1996.
Tjernberg et al. "Controlling Amyloid β-Peptide Fibril Formation With Protease-Stable Ligands", The Journal of Biological Chemistry, 272(19): 12601-12605, 1997.
Toniolo et al. "Control of Peptide Conformation by the Thorpe-Ingold Effect (Cα-Tetrasubstitution)", Biopolymers (Peptide Science), 60(6): 396-419, 2001.
Tonkinson et al. "Antisense Oligodeoxynucleotides as Clinical Therapeutic Agents", Cancer Investigation, 14(1): 54-65, 1996.
Tsai et al. "Synthesis of AIB-Containing Peptidomimetics as Potential Inhibitors of Alzheimer's γ-Secretase", 218th ACS National Meeting, New Orleans, USA, Meeting Abstract, MEDI-018, 1999. Abstract.
Verhoeyen et al. "Reshaping Human Antibodies: Grafting an Antilysozyme Activity", Science, 239: 1534-1536, 1988.
Vidal et al. "A Stop-Codon Mutation in the BRI Gene Associated With Familial British Dementia", Nature, 399: 776-781, 1999.
Westermark "Amyloid and Polypeptide Hormones: What is Their Interrelationship?", Amyloid: International Journal of Experimental & Clinical Investigation, 1: 47-60, 1994.
Westermark "Islet Amyloid Polypeptide: Pinpointing Amino Acid Residues Linked to Amyloid Fibril Formation", Proc. Natl. Acad. Sci. USA, 87: 5036-5040, 1990.
Whitlow et al. "Single-Chain Fv Proteins and Their Fusion Proteins", Methods: A Companion to Methods in Enzymology, 2(2): 97-105, 1991.
Wilesmith et al. "Bovine Spongiform Encephalopathy", Current Topics in Microbiology & Immunology, 172: 21-38, 1991.
Winoto et al. "A Novel, Inducible and T Cell-Specific Enhancer Located at the 3' End of the T Cell Receptor Alpha Locus", The EMBO Journal, 8(3): 729-733, 1989.
Winter et al. "Man-Made Antibodies", Nature, 349: 293-299, 1991.
Wolfenden et al. "Affinities of Amino Acid Side Chains for Solvent Water", Biochemistry, 20: 849-855, 1981.
Yamada et al. "Study of the Enzymatic Degradation of Endomorphin Analogs Containing α,α-Disubstituted Glycine", Peptide Science, 2000: 421-424, 2001.
Zaidi et al. "Forty Years of Calcitonin—Where Are We Now? A Tribute to the Work of Iain Macintyre, FRS", Bone, 30(5): 655-663, 2002.
Response Dated Oct. 22, 2010 to Notice of Reason for Rejection Dated Jul. 30, 2010 From the Japanese Patent Office Re. Application No. 2006-548581.
Examiner's Report Dated Feb. 17, 2009 From the Australian Government, IP Australia Re.: Application No. 2004203461.
Examiner's Report Dated Feb. 22, 2008 From the Australian Government, IP Australia Re.: Application No. 2004203461.
Examiner's Report Dated Jun. 22, 2009 From the Australian Government, IP Australia Re.: Application No. 2004203461.
International Preliminary Report on Patentability Dated Jan. 22, 2009 From the International Bureau of WIPO Re.: Application No. PCT/IL2004/000577.
International Preliminary Report on Patentability Dated Jan. 27, 2007 From the International Bureau of WIPO Re.: Application No. PCT/IL2005/000754.
International Search Report and the Written Opinion Dated Jul. 3, 2007 From the International Searching Authority Re.: Application No. PCT/IB2007/050141.
International Search Report and the Written Opinion Dated Oct. 5, 2005 From the International Searching Authority Re.: Application No. PCT/IL05/00051.
International Search Report and the Written Opinion Dated Aug. 7, 2008 From the International Searching Authority Re: Application No. PCT/IB07/50143.

International Search Report and the Written Opinion Dated Oct. 12, 2007 From the International Searching Authority Re.: Application No. PCT/IL2007/000091.
Requisition by the Examiner Dated Jan. 7, 2008 From the Canadian Intellectual Property Office Re.: Application No. 2,307,277.
Response Dated Nov. 2, 2009 to Reason for Rejection of Aug. 11, 2009 From the Japanese Patent Office Re.: Application No. 2003-563456.
Response Dated Feb. 7, 2010 to Notice of the Reason for Rejection of Oct. 22, 2009 From the Korean Intellectual Property Office Re.: Application No. 2004-7011868.
Response Dated Aug. 25, 2010 to Communication Pursuant to Article 94(3) EPC of Mar. 8, 2010 From the European Patent Office Re.: Application No. 07790037.1.
Translation of Notice of Reason for Rejection Dated Jul. 30, 2010 From the Japanese Patent Office Re. Application No. 2006-548581.
Communication Pursuant to Article 94(3) EPC Dated Sep. 14, 2010 From the European Patent Office Re. Application No. 07790037.1.
Communication Pursuant to Article 94(3) EPC of Apr. 8, 2011 From the European Patent Office Re. Application No. 07790037.1.
Office Action Dated Jan. 23, 2009 From the State Intellectual Property Office of the People's Republic of China Re.: Application No. 200580008115.4.
Response Dated Jan. 6, 2011 to Communication Pursuant to Article 94(3) EPC of Sep. 14, 2010 From the European Patent Office Re. Application No. 07790037.1.
Ausubel et al. Current Protocols in Molecular Biology, 1(Suppl.63). Not to Be IDS'd as per Hadassa (Not Relevant): May 4, 2006.
Chou et al. "Conformational Parameters for Amino Acids in Helical, ?-Sheet, and Random Coil Regions Calculated From Proteins", Biochemistry, 13(2): 211-222, 1974.
Claessens et al. "Review Commentary: ?-? Interactions in Self-Assembly", Journal of Physical Organic Chemistry, 10: 254-272, 1997.
Findeis et al. "Modified-Peptide Inhibitors of Amyloid ?-Peptide Polymerization", Biochemistry, 38: 6791-6800, 1999.
Fishwild et al. "High-Avidity Hum IgG? Monoclonal Antibodies From A Novel Strain of Minilocus Transgenic Mice", Nature Biotechnology, 14: 845-851, 1996.
Grateau "Le Curli du Coli: Une Vari?t? Physiologique d'Amilose [Coli's Curli or How Amyloid Can be Physiological]", M?decine Sciences, 18(6-7): p. 664, 2002.
H?ggqvist et al. "Medin: An Integral Fragment of Aortic Smooth Muscle Cell-Produced Lactadherin Forms the Most Common Human Amyloid", Proc. Natl. Acad. Sci. USA, 96: 8669-8674, 1999.
H?ppener et al. "Islet Amyloid and Type 2 Diabetes Mellitus", The New England Journal of Medicine, 343(6): 411-419, 2000.
Hoeppener et al. "The Complete Islet Amyloid Polypeptide Precursor Is Encoded by Two Exons", Biochemical & Biophysical Research Communications, 189: 1569-1577, 1993. Database, Accession No. S04016, 1993. Claims 1-16, 22-26.
Hoogenboom et al. "By-Passing Immunisation. Human Antibodies From Synthetic Repertoires of Germline V? Gene Segments Rearranged In Vitro", Journal of Molecular Biology, 227: 381-388, 1992.
Jelokhani-Niaraki et al "Changes in Conformation and Antimicrobial Properties Caused by Replacement of D-Amino Acids With ?-Aminoisobutyric Acid in the Gramicidin Backbbone: Synthesis and Circular Dichroic Studies", Journal of the Chemical Society Perkin Transactions, 2: 1 187-1193, 1992.
Karle et al. "Structural Characteristics of ?-Helical Peptide Molecules Contianing Aib Residues", Biochemistry, 29(29): 6747-6756, Jul. 24, 1990.
Lowe et al. "Structure-Function Relationships for Inhibitors of ?-Amyloid Toxicity Containing the Recognition Sequence KLVFF", Biochemistry, 40: 7882-7889, 2001.
McGaughey et al. "?-Stacking Interactions", The Journal of Biological Chemistry, 273(25): 15458-15463, 1998.
Petkova et al. "A Structural Model for Alzheimer's ?-Amyloid Fibrils Based on Experimental Constraints From Solid State NMR", Proc. Natl. Acad. Sci. USA, 99(26): 16742-16747, 2002.
Porter "The Hydrolysis of Rabbit ?-Globulin and Antibodies With Crystalline Papain", Biochemical Journal, 73: 119-126, 1959.
Solomon et al. "Disaggregation of Alzheimer ?-Amyloid by Site-Directed MAb", Proc. Natl. Acad. Sci. USA, 94: 4109-4112, 1997.

Soto et al. "Inhibition of Alzheimer's Amyloidosis by Peptides That Prevent ?-Sheet Conformation", Biochemical and Biophysical Research Communications, 226(3): 672-680, 1996.

Tjernberg et al. "Arrest of ?-Amyloid Fibril Formation by A Pentapeptide Ligand", The Journal of Biological Chemistry, 271(15): 8545-8548, 1996.

Tjernberg et al. "Controlling Amyloid ?-Peptide Fibril Formation With Protease-Stable Ligands", The Journal of Biological Chemistry, 272(19): 12601-12605, 1997.

Toniolo et al. "Control of Peptide Conformation by the Thorpe-Ingold Effect (C?-Tetrasubstitution)", Biopolymers (Peptide Science), 60(6): 396-419, 2001.

Tsai et al. "Synthesis of AIB-Containing Peptidomimetics as Potential Inhibitors of Alzheimer's ?-Secretase", 218th ACS National Meeting, New Orleans, USA, Meeting Abstract, MEDI-018, 1999. Abstract.

Yamada et al. "Study of the Enzymatic Degradation of Endomorphin Analogs Containing ?,?-Disubstituted Glycine", Peptide Science, 2000: 421-424, 2001.

Response Dated Mar. 14, 2011 to Communication Pursuant to Article 94(3) EPC of Sep. 14, 2010 From the European Patent Office Re. Application No. 07790037.1.

Notice of Allowance Dated May 23, 2011 From the Israel Patent Office Re. Application No. 176757.

Translation of Notice of Reason for Rejection Dated Jun. 14, 2011 From the Japanese Patent Office Re. Application No. 2006-548581.

* cited by examiner

FEEDING FORMULA APPLIANCE

RELATED APPLICATION

This application is a continuation-in-part of U.S. patent application Ser. No. 10/755,289, filed on Jan. 13, 2004 now U.S. Pat. No. 7,104,184, the contents of which are incorporated herein by reference.

FIELD AND BACKGROUND OF THE INVENTION

The present invention relates to the field of food preparation and, more particularly, to a device and a method for the preparation of fluid food from formula at a desired consumption temperature, and to preparation of foods from components selected based on personal preferences and/or nutritional needs of individual users. The present invention is useful, for example, in preparing food for infants, in preparing food according to individualized nutritional requirements of individuals of all ages, and in personalized drink preparation.

The need for substitutes for mother's milk predates history with biblical and legendary references to human or canine, especially lupine, wet nurses as alternatives for mothers who were unable to nurse their babies. While wet nurses are still the alternative most approximating mother's milk, milk substitutes prepared from powdered or liquid formulas are now the preferred alternative. Most present day baby caregivers use commercially available formulas for preparing fluid food to feed the babies in their care. The use of formula generally involves the following five steps:

1. Water is heated, generally by boiling for a few seconds, and then cooled to near a consumption temperature;
2. An appropriate amount of powdered or concentrated formula is placed in a serving vessel such as a baby bottle;
3. An appropriate amount of the cooled sterilized water is put into the serving vessel;
4. A fluid food is achieved by mixing, for example by vigorous agitation of the serving vessel; and
5. The temperature of the fluid food is tested. If the temperature is not the proper consumption temperature, steps are taken to either increase or decrease the temperature of the food as may be required.

Because infants must be fed approximately five or six times a day, it is not uncommon that this process takes place in the middle of the night. Moreover, it is commonly carried out with one hand while holding a hungry and screaming infant in the other hand. As a result there is a demand for a device that quickly and easily prepares ready to consume fluid food, especially for infants. Further, as all these steps are manual, the temperature at which the food is served is not precise. Many such devices are known in the art, all with certain limitations and none that prepare, on demand, a bottle of fluid food from formula at a desired consumption temperature.

U.S. Pat. No. 5,808,276 discloses a device that attempts to solve the stated problem, by allowing a caregiver to prepare a bottle with the desired formula in advance of its need. The device therein disclosed heats and agitates an already prepared bottle of fluid food.

U.S. Pat. No. 3,352,460 provides a device for storing and dispensing liquid formula. This device employs two compartments, one for heating water and another for cooling the water by refrigeration. The device has a number of drawbacks, including not sufficiently sterilizing the water; dispensing the fluid food at too high a temperature so that it must cool in the bottle before serving. The food is therefore not ready on demand and the baby is in risk of being burned. Overheating may reduce the nutritional value of the food. Further, not all the food may be consumed. Even further, there are no provisions for the addition of any ingredients to the food beyond water and formula.

Other attempts made to address the need for prepared fluid food for infants, include:

U.S. Pat. No. 5,397,031 which discloses a device for preparing fluid food from formula at a baby's bedside. The device does not sterilize the water used, does not provide for the addition of other ingredients, and the baby must wait for the food to reach consumption temperature.

U.S. Pat. No. 5,419,445 shows a device that provides a complex method of separating the components of fluid food for convenient mixing at a later time, preferably by agitation of the bottle in order to cause the formula to dissolve in the water. It makes no provision for preparing fluid food at a desired consumption temperature.

U.S. Pat. No. 5,570,816 shows a device which only begins heating food when activated by the user, requiring the infant to wait. In addition, the device does not boil the water long enough for it to be sufficiently sterilized and it makes no provision for the addition of other ingredients to the food.

U.S. Pat. No. 5,797,313 shows a device governed by a timer which allows a user to determine when a bottle of fluid food made from formula will be ready. This is a useful feature if it is known precisely when the infant will wake up in the middle of the night. If the infant wishes to eat at times other than the set times or to consume different amounts of food at different times, the device must be activated and the infant must wait for the food to be prepared and heated to the desired consumption temperature.

U.S. Pat. Nos. 6,118,933 and 6,253,028 disclose a device for preparing fluid food from formula which uses filtered water, rather than boiling the water for sterilization.

PCT WO97/47224 discloses a multiple bottle preparing device which heats up a bottle of fluid food to consumption temperature when activated. This device provides certain advantages for caregivers with multiple babies to feed but still requires the infant to wait for a bottle of food to be brought to the desired consumption temperature.

There exist many other devices which mix ingredients in order to prepare fluid food which are used in the food service industry, as shown in U.S. Pat. Nos. 3,218,175; 4,139,125; 4,651,862; 4,753,370; 4,791,860; 4,993,593 and British Patent GB 2 019 813 A. These devices are not compatible with infant formula.

In addition, it is known that many infants have special nutrition needs, ranging from those with preferences for different consumption temperatures to those that require medication or other additives or specific combination of ingredients and additives in their food. A device that can individualize the composition of fluid food according to specific requirements and automatically prepare and provide that food on-demand does not exist.

It is further noted that for infants, geriatric patients, and recuperating patients and others with special needs, it would be highly advantageous to have a feedback-cycle whereby characteristics of the users (weight, activity) could be used to calculate recommended quantities of food and food additives to be provided to users. Centralized reporting and responding to such data could also be highly useful, for everything from providing clinical diagnostic information to care-givers to organizing efficient periodic re-supply of food components to liquid-food-providing machines.

There is thus a widely recognized need for, and it would be highly advantageous to have, a device for the preparation of fluid food from formula that overcomes the disadvantages of prior art devices.

With reference to adult nutrition, a variety of specialized nutritional goals has come or will soon come into public awareness. Problems of obesity and inappropriate nutrition are matters of growing concern in the field of public health. It has been estimated that 20% of the American population suffers from obesity, and the numbers elsewhere in the world appear to be increasing as well. Children and even infants are showing signs of over-eating in increasing numbers.

A large proportion of the population also suffers from inappropriate nutrition, in the sense that, while their caloric intake may be adequate or even excessive, their choice of foods fails to provide a sufficiency of various essential nutritional needs.

Additionally, both among adults and among children, populations exist which have special health or nutritional needs, these populations ranging from the very weak (e.g., elderly patients with specific nutritional needs and problematic digestions) to the very strong (e.g. professional athletes with specific nutritional requirements designed to meet bodybuilding or other sports-related nutritional goals).

A new type of user-specific nutrition is also expected to soon come increasingly to public awareness: "nutrigenomics", personalized nutrition based on genetic analysis of the individual, is not yet a household word, but progress being made in the analysis of genetic material to identify specific needs and predispositions of the individual, and it is to be expected that in the near future such analyses will be available to an increasingly large population, and that detailed and specific nutritional recommendations for individuals will increasingly determined on a specific person-by-person basis, based on genetic investigation of the individual as well as other sources such as physician's advice. It is likely that many such recommendations will include specific consumption of food supplements.

Thus, there is a widely recognized need for, and it would be highly advantageous to have, a device operable to receive both general information about human nutritional requirements and specific information about nutritional requirements of a particular individual, further operable to receive detailed information about that individual's current physical state, his recent or planned activities, and his recent or planned food consumption, and, based on this collected information, to design and prepare a food or food supplement tailored to the nutritional state and nutritional goals of that individual.

With respect to another aspect of human nutrition, it may be noted that existing appliances for food and drink preparation are ill equipped to provide for easy and accurate supply of food and drink where individual differences of diet and individual preferences of taste are involved. If one family member likes his coffee lukewarm with two sugars and no milk and a second family member prefers his coffee with one sugar, 20% milk and very hot, then either a family member or a paid assistance will be required to concoct the desired drinks. Thus, there is a widely recognized need for, and it would be highly advantageous to have, a device operable to prepare hot and cold drinks according to prerecorded individual preferences or according to prerecorded complex recipes of components and required actions.

It may be noted a variety of nutrients which have been found by modern nutritional science to be desirable as food additives are not in common use for a variety of reasons having to do with convenience and practicality of use, and the economics and bureaucratic complexities of introducing them into mass-consumption products. For example, with respect to the combination of docosahexaenoic acid (DHA) and arachidonic acid (ARA) (the combination referred to hereafter as "DHA-ARA"), there was a delay of something like five years between the discovery that DHA-ARA is of value in enhancing infant health, and the beginnings of introduction of DHA-ARA into popular baby formula products. The additive was expensive, not universally approved (Europe was faster than the U.S.A. in granting approval), and introduction of such an additive to a product line requires major changes in both production and marketing, hence introduction of this additive to mass-market informulas was subject to delay. Thus, it is not uncommon to have food additives though to be desirable by parents and/or family doctors be unavailable in commercial formula preparations.

Hand mixing of DHA-ARA into an infant formula is impractical, given that the amount of DHA-ARA to be used is extremely tiny fraction (less than 0.01%) of the amount of standard infant formula with which it should be mixed. With all additives, underdosing leads the additive to be ineffective. With some additives, overdosing may risk impair health and/or growth.

Even if DHA-ARA or a similar additive were also supplied in highly diluted form, e.g. mixed with a powder base of some sort, hand mixing of baby formula with such a diluted component would still be impractical. Dilution of DHA-ARA to the extent that the dilution might be hand-mixed with infant formula would result in the diluant used constituting and undesirably large component of the resultant mix. Yet, while a parent might mix "by eye" with adequate accuracy a 100 gram portion of one substance with, say, a 50 gram portion of another, no parent could be expected to reliably combine 100 grams of one substance with, say, 0.5 grams of something else. Thus, there is a widely recognized need for, and it would be highly advantageous to have, a method and device operable to reliably measure and supply extremely small quantities of solid or liquid ingredients, as components of a prepared infant formula or other form of prepared food or drink.

SUMMARY OF THE INVENTION

Herein, by formula is meant a solid or liquid concentrated composition that is mixed with a liquid, such as water, to make a fluid food. Although there exist many such formulae, for example in the field of geriatrics, health food, food supplements, sport nutrition, animal-care and veterinary medicine, the present invention will be described, for illustrative purposes, in the context of using powdered or liquid formula for feeding infants, especially human infants.

It is an object of the present invention to provide a device and a method for preparing fluid food from a formula (that is a standard formula or a personalized formula) on demand and at a desired consumption temperature.

It is preferred that a device and method of the present invention positively sterilize water by boiling for an extended period of time and that it retains the water in a substantially sterile condition.

It is preferred that a device and method of the present invention capture the steam produced by the boiling of the water and returns the vapors to the water such that the concentration of minerals and other substances in the water does not increase as a result of sterilization or heating.

It is preferred that a device and method of the present invention be configured to vary the feeding formula according to user input, both on-site and remotely.

It is preferred that a device and method of the present invention be configured so that ingredients (such as formula) do not contaminate the device.

According to one aspect of the present invention there is provided a device for preparing a fluid food having with a desired consumption temperature on demand comprising (a) at least two water reservoirs, each having an independently controllable water outlet operable on demand and a thermal sensor for detecting a temperature of water therein; (b) at least one container for holding formula (liquid or solid) having a controllable dispenser for dispending the formula on demand; (c) a data processor operably coupled with each thermal sensor, for receiving thermal records therefrom and for determining a quantity of water from each of the reservoirs needed to mix with a quantity of formula in order to achieve fluid food having a desired consumption temperature; and (d) a controller operably coupled with the data processor, each controllable outlet and the controllable dispenser for dispensing the quantity of water from each of the water reservoirs and for dispensing the quantity of formula from the container, so as to prepare the fluid food with the desired consumption temperature.

According to another aspect of the present invention there is provided a method of preparing, on demand, a fluid food of a desired consumption temperature, the method comprising using an automated device for dispensing desired quantities of water of a first temperature, water of a second temperature and formula into a vessel, so as to obtain fluid food of a desired consumption temperature, on demand.

According to features in the described preferred embodiments, the data processor and the controller are integrated on a single electronic chip.

According to features in the described preferred embodiments, the processor is operatively coupled with a user interface for displaying information related to the fluid food and for accepting input related to the fluid food, such that the controller controls the dispensing of the quantities of water and the quantity of formula according to the input.

According to further features in the described preferred embodiments, at least one of the reservoirs contains a heater for heating the water.

According to further features in the described preferred embodiments, more than one of the reservoirs contains a heater for heating the water.

According to further features in the described preferred embodiments, at least one of the reservoirs contains a heater for boiling the water.

According to further features in the described preferred embodiments, each of the reservoirs contains a heater for boiling the water.

According to further features in the described preferred embodiments, the heater is designed to operate and boil water in contact therewith, preferably for a period of at least twenty seconds. Although such boiling does not necessarily sterilize the water, one skilled in the art recognizes that the microbe count of such boiled water is significantly reduced.

According to further features in the described preferred embodiments, the reservoir is constructed so that steam produced by boiling the water therein remains captured and reliquifiable when cooled. An advantage of such a feature is that the composition of the water, for example the concentration of minerals, remains substantially unchanged despite periodic reheating. Importantly, the present invention allows at least about 20 seconds of boiling as recommended by health-care professionals.

According to further features in the described preferred embodiments, the heater is designed to operate and boil water periodically at predetermined intervals.

According to further features in the described preferred embodiments, the heater is designed to operate and boil water in contact therewith about every 1-5 hours.

According to further features in the described preferred embodiments, the heater is designed to operate and boil water in contact therewith about every 2-4 hours.

According to further features in the described preferred embodiments, the heater is designed to operate and boil water in contact therewith about every 3 hours.

According to further features in the described preferred embodiments, the heaters or respective reservoirs are synchronized to alternately periodically operate, such that at any given time, one of the reservoirs contains water at a temperature above the desired consumption temperature, and the other reservoir contains water at a temperature below the desired consumption temperature. A typical consumption temperature for food for human infants is generally between about 25° C. and about 35° C.

According to further features in the described preferred embodiments, the desired consumption temperature is between about 25° C. and about 35° C., the data processor and the controller being designed and configured for determining the quantity of water from each of the reservoirs needed to mix with the quantity of the formula in order to achieve fluid food having a desired consumption temperature.

According to further features in the described preferred embodiments, the container is designed and constructed for recharging with the food formulation when depleted.

According to further features in the described preferred embodiments, the container is prepackaged with formula and is disposable when depleted. Preferably such a disposable container has an automatically readable label having salient details concerning the formula contained therein. Such automatically readable label can, for example, include a radio transmitter, bar code or electric circuit. Clearly in such a case, the device of the present invention is appropriately modified so as to read the automatically readable label. Obviously, the device is preferably configured to reject an inappropriately labeled formula package.

According to further features in the described preferred embodiments, the container is designed and constructed to operably accept therein a prepackaged refill containing the formula.

According to further features in the described preferred embodiments, the device further comprises at least one additional container for holding at least one additional ingredient, the additional container having a controllable dispenser for optionally dispensing a predetermined quantity of the additional ingredient.

According to further features in the described preferred embodiments, the additional ingredient is at least one food supplement.

According to further features in the described preferred embodiments, the additional ingredient is at least one medicament.

According to further features in the described preferred embodiments, the additional ingredient is a flavoring.

According to further features in the described preferred embodiments, the container and the controllable dispenser for dispensing the formula on demand are designed and constructed so as to substantially avoid dispensing any of the formula so that the controllable water outlet will become contaminated with formula remnants.

According to further features in the described preferred embodiments, the fluid food produced by the invention is suitable for feeding a human infant.

According to further features in the described preferred embodiments, the fluid food produced is suitable for feeding a person needing or desiring liquid food.

According to further features in the described preferred embodiments, the processor communicates with a communication server for communicating data related to the formula and/or fluid food via a communications network.

According to further features in the described preferred embodiments, the method further comprises heating water contained in at least one of the reservoirs.

According to further features in the described preferred embodiments, the method further comprises heating water contained in each of the reservoirs.

According to further features in the described preferred embodiments, the method further comprises boiling water contained in at least one of the reservoirs.

According to further features in the described preferred embodiments, the method further comprises boiling the water for a period of at least 20 seconds.

According to further features in the described preferred embodiments, the method further comprises boiling the water such that steam produced thereby remains captured and reliquifiable when cooled.

According to further features in the described preferred embodiments, the method further comprises periodically reboiling the water at predetermined intervals.

According to further features in the described preferred embodiments, the method further comprises boiling the water every about 1 hour to about 5 hours.

According to further features in the described preferred embodiments, the method further comprises boiling the water every about 2 hours to about 4 hours.

According to further features in the described preferred embodiments, the method further comprises boiling the water about every about 3 hours.

According to further features in the described preferred embodiments, the method further comprises boiling water contained in each of said reservoirs.

According to further features in the described preferred embodiments, the method further comprises alternately periodically heating the water in each respective reservoir, so that at any given time one of the reservoirs contains water at a temperature above the desired consumption temperature, and the other reservoir contains water at a temperature below the desired consumption temperature.

According to further features in the described preferred embodiments, the method further comprises dispensing the formula so as to substantially avoid contaminating components of the device and especially the controllable water outlet with formula remnants.

According to further features in the described preferred embodiments, the method further comprises using the device for optionally dispensing a desired quantity of the additional ingredient.

According to further features in the described preferred embodiments, the method further comprises providing input to the processor via the user interface such that the device dispenses the desired quantities of water and of the formula according to the input.

According to further features in the described preferred embodiments, the method further comprises transmitting data (e.g. by wired or wireless means) related to the fluid food and/or formula to a remote location (e.g. to a health care provider, hospital, formula-manufacturing company). Data that may be desirable to transmit includes but is not limited to quantity of food prepared, quantity of food consumed, date and time, temperature and the like.

There is also provided according to the teachings of the present invention a method of selling fluid food comprising a. providing a device of the present invention in a publicly accessible location such as a store, an airport or the like; b. identifying the device with a mark associated with a formula manufacturer (such as a trademark, trade dress and the like), c. introducing in dispensers of the device a formula associated with the formula manufacturer; and d. providing a customer with fluid food made by the device. Usually parents are careful what food they give their infants. However, when parents encounter a device of the present clearly associated with a well-known formula manufacturer and knowing that a device of the present invention provides safe and hygienically prepared fluid food, they will purchase food from the device. In order to save the carrying of containers of formula, clean bottles and assorted paraphernalia, parents will preferentially flock to locations implementing the method of selling fluid food of the present invention.

According to another aspect of the present invention there is provided a device for preparing a food at a predetermined temperature and concentration, comprising: (a) a mixing container for combining a selected quantity of food concentrate with a selected quantity of water; (b) a food supply operable to supply a measured quantity of food to the mixing container; (c) a first water supply operable to supply a measured quantity of water at a first temperature to the mixing container; (d) a second water supply operable to supply a measured quantity of water at a second temperature to the mixing container; and (e) a data processor operable to select a first quantity of water to be delivered from the first water supply to the mixing container and to select a second quantity of water to be delivered from the second water supply to the mixing container, and further operable to select a third quantity of food to be distributed from the food supply to the mixing container, such that a mixture thereby obtained will be in a desired predetermined concentrations and at a desired predetermined temperature. According to further features in the described preferred embodiments, the device further comprises a food additive supply operable to supply a measured quantity of a food additive to the mixing container. In a preferred embodiment the measured quantity may be five grams or less.

Preferably, the device further comprises a plurality of food supplies, and data processor is operable to select measured quantities of food from each of the plurality of food supplies.

According to further features in the described preferred embodiments, the data processor is operable to receive and record information pertaining to nutritional needs of an individual. The data processor is operable to select measured quantities of food from each of the plurality of food supplies, selection of the measured quantities of food being based on calculation referencing the received and recorded information. Preferably, the data processor is operable to receive the information from at least one of a group of sources including a human user interface, an internet connection, an infra-red data connection, a digital scale operable to report weight of a consumer, and a voice recognition module.

According to further features in the described preferred embodiments, the data processor is operable to receive information relating to nutritional requirements of an individual and to at least partially base the calculation on the received nutritional requirements. The received information relating to nutritional requirements of an individual may be at least partially determined by genetic analysis of the individual.

According to further features in the described preferred embodiments, the data processor is operable to receive information relating to physical activities of an individual and to at least partially base the calculation on the received physical activity information.

According to further features in the described preferred embodiments, the data processor is operable to receive a report of recent food consumption of an individual and to at least partially base the calculation on the received recent food consumption information.

According to further features in the described preferred embodiments, the data processor is further operable to record the received information and to report a summary of long-term trends therein.

According to further features in the described preferred embodiments, the first and second water supplies are adapted to be refilled by water provided by a particular water supply company.

According to further features in the described preferred embodiments, the device is further operable to prepare personalized hot drinks. In a preferred embodiment, the device is operable to prepare personalized cups.

According to yet another aspect of the present invention there is provided a method for preparing a food containing a small quantity of a food additive, the small quantity being inferior to 0.01 grams per dose, the method comprising (a) creating an additive mix by pre-mixing the additive with a carrier, in such proportion that a desired dose of the additive is contained in between 0.5 gram and 5 gram of the additive mix; and (b) providing a mechanical delivery system operable to add a selected quantity between 0.5 grams and 5 grams of the additive mix to a prepared food.

Preferably water is boiled and all or most of the resulting steam is captured and condensed back into the water such that the concentration of minerals and other substances in the water does not increase as a result of boiling. Optionally, water may be heated to 100° C. in a closed pressurized container, thereby sterilizing the water without significant boiling. Preferably the number of microbes in the water is reduced or even eliminated, and the water stored so as to prevent outside contamination. Preferably the exact composition of fluid food produced can be varied according to user input, both on site and remotely. Preferably ingredients do not contaminate the device.

According to yet another aspect of the present invention there is provided a method of marketing food comprising: (a) providing a fluid-food preparation device in a location, the device being operable to prepare a sterile liquid food by combining at least one dry food component with sterile water and serving the combination accurately heated to a predetermined temperature; (b) identifying the device as being associated with at least one mark, the mark associated with a manufacturer of at least one component of the combination; (c) introducing in a dispenser of the device a food component associated with the food component manufacturer; and (d) providing a customer with fluid food made by the device.

According to further features in the described preferred embodiments, the device comprises a first water reservoir which comprises a first controllable water outlet, a first heater operable to heat water in the first reservoir and a first thermal sensor operable to report temperature of water contained in the first reservoir; a second water reservoir which comprises a second controllable water outlet, a second heater operable to heat water in the second reservoir and a second thermal sensor operable to report temperature of water contained in the second reservoir; a first container for holding a dry food component, the first container having a first controllable dispenser for dispensing the dry food component; and a data-processor/controller operable to receive water temperature data from the first and second thermal sensors, further operable to calculate a quantity of water from each of the first and second reservoirs needed to mix with a quantity of the formula in order to prepare the fluid food at the desired consumption temperature, and further operable to control operation of the first and second controllable water outlets so as to dispense the calculated quantities of water for mixing with the quantity of dry food component, the data-processor/controller being further designed and configured to command alternating periodic heating of water in the first and second reservoirs to sterilization temperatures, the periodic heating being so controlled that at first times the first reservoir contains water at a temperature above the desired consumption temperature and the second reservoir contains water below the desired consumption temperature, and at second times the first reservoir contains water at a temperature below the desired consumption temperature and the second reservoir contains water above the desired consumption temperature, thereby enabling periodic sterilization by boiling of water in both the first and the second reservoirs, and also enabling the production of food at the desired consumption temperature by mixing of the formula with selected amounts of water from the first and second reservoirs.

According to yet further features in the described preferred embodiments, the manufacturer is a manufacturer of a product selected from a group consisting of infant food formula, geriatric food formula, sports-food formula, and bottled water. The device is preferably identified as being associated with a plurality of marks, each mark associated with a manufacturer of at least one component of the combination, and wherein the device comprises an interface by means of which a user may select among mark-identified components, and wherein the device is operable to combine the user-selected components during the food preparation.

According to further features in the described preferred embodiments, the method further comprises enabling a user to select among baby formulas manufactured by a plurality of baby formula manufacturers, or among a plurality of types of water.

Preferably, the location is accessible to the general public. Providing a customer with fluid food may be contingent on payment.

Preferably, the method further comprises providing a data-collection module in the device, collecting data from a user, and providing a service selected from a group consisting of making a recommendation based on the data and of combining the components in amounts calculated according to the data.

The first container is preferably designed and constructed to be rechargeable with a food component package having a specialized form and sold by the manufacturer associated with the at least one mark. Alternatively, the first container is designed and constructed as a food component package having a specialized form and sold by the manufacturer associated with the at least one mark, the package being disposable when depleted, and wherein the device is designed and constructed to operably accept therein the food component package as the first container.

According to further features in the described preferred embodiments, the method further comprises providing a processor and a communication module in the device and using the processor and the communication module to communicate information related to operation of the device via a communication network.

The device preferably comprises a weight sensor operable to weigh a recipient for the fluid food before and after filling of the recipient, and the method further comprises calculating and recording amounts of food consumed by a user by subtracting, from a recorded weight of a recipient containing freshly prepared food, a detected weight of the food-containing recipient subsequent to food consumption by the user.

According to further features in the described preferred embodiments, the method further comprises providing a plurality of the devices in a plurality of locations, providing each of the devices with a processor and a communications module, providing a central server operated by a service bureau and operable to communicate with each of the plurality of devices, and periodically establishing communication between the server and the devices.

The devices are preferably operable to communicate device usage information to the service bureau by means of the processors and communications modules, and the method further comprises use of the information by the service bureau for management of customer relations between the bureau and a plurality of users of the plurality of devices. The service bureau preferably utilizes the information received by the service bureau to manage re-supply of the components to the plurality of devices. Preferably each of the devices further comprises a user interface operable to receive input from a user and further operable to communicate a message from the bureau to the user, the method further comprises transmitting from the service bureau to at least one of the devices a message selected from a group consisting of a baby-care recommendation, a patient-care recommendation, a publicity statement, a public service announcement, and a sales offer. Preferably, the interface comprises an element useable by a user to indicate that the user wishes to order re-supply of a food component by the service bureau.

According to yet another aspect of the present invention there is provided a method of marketing a food for babies comprising selling baby-food in tablet form.

The present invention successfully addresses the shortcomings of the presently known configurations by providing a method and a device for preparing a fluid food on demand at a temperature appropriate for consumption.

The present invention further successfully addresses the shortcomings of the presently known configurations by providing means whereby characteristics of the users (e.g. weight, activity) can be used to calculate recommended quantities of food and food additives to be provided, and means whereby centralized reporting of and responding to such data can provide clinical diagnostic information to care-givers and can be used to organizing efficient periodic re-supply of food components to users of a plurality of liquid-food-providing machines.

The present invention further successfully addresses the shortcomings of the presently known configurations by providing a device operable to receive both general information about human nutritional requirements and specific information about nutritional requirements of a particular individual, further operable to receive detailed information about that individual's current physical state, his recent or planned activities, and his recent or planned food consumption, and, based on this collected information, to select and to prepare a food or food supplement designed to meet selected nutritional goals for that individual.

The present invention still further successfully addresses the shortcomings of the presently known configurations by providing a device operable to prepare hot and cold drinks according to prerecorded individual preferences or according to prerecorded complex recipes of components and required actions.

The present invention still further successfully addresses the shortcomings of the presently known configurations by providing a method and device operable to reliably measure and supply extremely small quantities of solid or liquid ingredients, as components of a prepared infant formula or other form of prepared food or drink.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
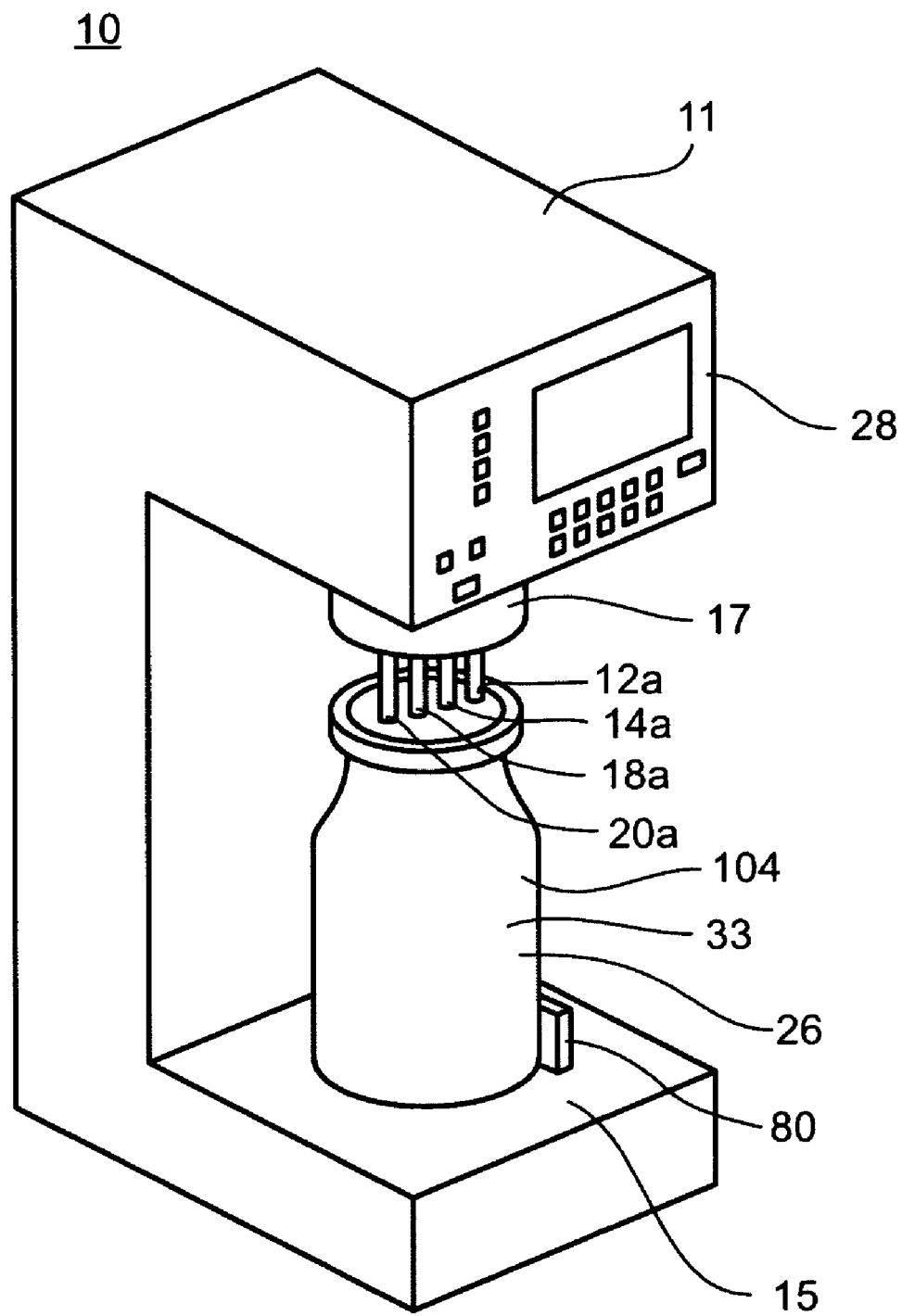
FIGS. 1A and 1B are pictorial views illustrating a feeding formula device constructed in accordance with the present invention.

The present invention is of a device and a method for the preparation of fluid food from formula at a desired consumption temperature on demand, and for preparation of a food whose composition is calculated according to nutritional needs and/or taste preferences of an individual consumer.

The principles and operation of a device and a method according to the present invention may be better understood with reference to the drawings and accompanying descriptions.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In case of conflict, the patent specification, including definitions, will control. In addition, the materials, methods, and examples are illustrative only and not intended to be limiting.

The word "food", as used herein, is to be understood to include any orally consumable product. Thus, infant formula is a "food", coffee is a "food", and even products having little or no nutritional value, such as, for example, an artificial sweetener, are to be considered a "food" as that word is used herein. Although various embodiments will be described in with respect to preparation of food for infants or for other specific populations, these examples are to be understood as exemplary and are not to be considered as limiting.

Reference is now made to FIG. 1A that shows a pictorial view of a feeding formula device constructed in accordance with the teachings of the present invention, which is referred to hereinbelow as device 10.

Device 10 is designed and constructed to dispense two quantities of water of different temperatures from two reservoirs that are mixed with formula in order to prepare a fluid food of a desired consumption temperature.

Device 10 is preferably configured to dispense the water and formula directly into a mixing container 104, such as a baby bottle 26, so that the fluid food thus prepared is ready to be served to a baby.

Device 10 will hereinafter be described in this context, although it is understood that device 10 may be employed for preparing any fluid food comprising water and a dry (e.g. powdered) formula, or water and a liquid formula (e.g. concentrate), for any purpose.

Such fluid food may be for oral ingestion by ill persons, those who cannot ingest or digest solid materials or persons on restricted diets. Device 10 may be used for preparing enteral feeding formulas or even feeding formulas for animals. Therefore, the reference to a baby bottle, hereinafter referred to as bottle 26, is solely exemplary and is not limiting to the scope of the invention. Any baby bottle or any other drinking or administering vessel with acceptable dimensions may be substituted in appropriate circumstances. For example, the role of "bottle 26" may be fulfilled by a serving bowl or a coffee cup, or any container in which ingredients provided by device 10 can be collected and mixed. Bottle 26 is alternately referred to as a "mixing container" in the claims hereinbelow.

Device 10 comprises a housing 11 which has a user interface 28 for displaying data and information related to a fluid food and/or formula to a user and for accepting input from a user related thereto. Interface 28 will be discussed more fully hereinafter with respect to FIG. 4. Housing 11 includes a vessel sealer 17 which descends to seal the opening of bottle 26 when it is being filled, preferably four conduits 12a, 14a, 18a and 20a for introducing ingredients into bottle 26, and base 15 on which bottle 26 rests when being filled. Base 15 optionally comprises heating elements for maintaining warm temperature of a prepared food in bottle 26 subsequent to food preparation or for re-warming a previously-prepared food.

Figure 2:
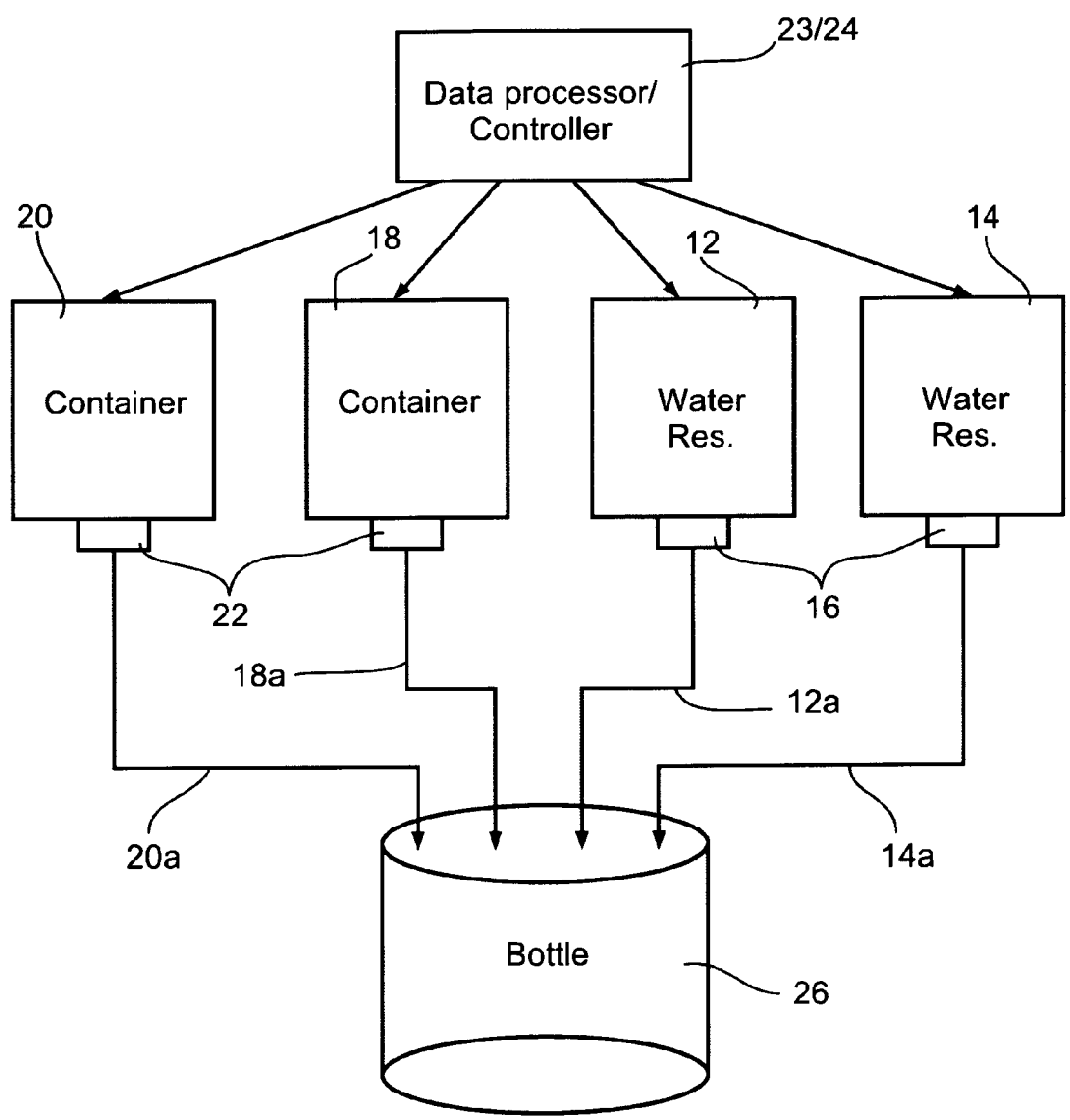
FIG. 2 is a schematic diagram of the device of FIG. 1.

Reference is now made to FIG. 2 that shows a schematic diagram of components of device 10. Device 10 comprises at least two water reservoirs, hereinafter referred to as reservoir 12 and reservoir 14 respectively. Reservoirs 12 and 14 may vary in size depending upon the frequency of use of device 10. For example, if device 10 is used at home for a single infant, the capacity of reservoirs 12 and 14 will preferably be a maximum of one liter each, so that water therein will not stand and become stale after a long period. On the other hand, if device 10 is used for a number of babies, it may reasonably employ larger reservoirs 12 and 14 or may have an additional integral or auxiliary feeder reservoir (not shown) which supplies reservoirs 12 and 14 with water on an as needed basis, possibly using automatic demand valves such as a float activated needle valve such as found in an auto engine carburetor or in a toilet tank.

In a preferred embodiment of the invention, reservoirs 12 and 14 are each provided with a heater (shown in FIG. 3) for the purpose of heating the water therein. Device 10 boils the water in reservoirs 12 and 14 for a period of at least twenty seconds, preferably for a period of five minutes or more, in order to assure sterilization. Preferably, the boiling is carried out in such a way that all or most of the steam produced thereby does not escape into the atmosphere but is captured so that the steam is reliquifiable upon condensation when cooled and returned to the water body within each reservoir 12 and 14 so that the boiling process does not result in increased concentrations of minerals, chemicals or other elements. Optionally, water may be heated to 100° C. in a closed pressurized container, thereby sterilizing the water without significant boiling.

Such boiling or sterilizing is carried out, for each of the reservoirs, periodically every one to five hours, or every two to four hours or preferably every about three hours. In a preferred embodiment, the heaters of reservoirs 12 and 14 are synchronized to alternately operation periodically, so that the boiling of the water in each reservoir 12 and 14 is offset such that at any given time, one of reservoirs 12 and 14 contains water at a temperature above the desired consumption temperature and the other of reservoirs 12 and 14 contains water at a temperature below the desired consumption temperature, such that, at any given time, it is possible to mix calculated proportions of water from reservoirs 12 and 14 to yield water at the desired consumption temperature.

Reservoirs 12 and 14 also preferably have deployed therein thermal sensors for detecting the temperature of the water contained therein. The purpose and functioning of the sensors will be discussed more fully hereinafter with respect to FIG. 3, in which they are shown.

Each of reservoirs 12 and 14 also has a controllable water outlet 16 which is operable at demand by a controller 24, described hereinafter. Each outlet 16 preferably has a conduit leading from it to the entrance of bottle 26. The conduits are designated 12a and 14a respectively, signifying the reservoir from which they convey water to bottle 26.

In an alternate embodiment, an ultraviolet light source may be associated with or included within reservoirs 12 and 14, either in addition to other heating elements or in place thereof. UV light could then be used to warm/heat water and to sterilize and/or maintain sterilization of water in reservoirs 12 and 14 or in other portions of device 10.

Device 10 also comprises a container 18 for holding formula, e.g., a dry or liquid formula, or any food concentrate.

Container 18 may be any appropriate sized container consistent with the quantity of food formulation to be held and dispensed. As with water, it is not wise to have a large quantity of the food formulation remain in container 18 for extended periods of time where it may be subject to quality-degradation due to the effects of humidity, temperature, light and atmospheric oxygen. It is preferable to store formula stored under inert and protected conditions and introduce into container 18 only the amount to be dispensed in the near future. As is well-known to one skilled in the art, certain additives such as essential-fatty acids decompose quickly when exposed to oxygen, humidity or light. The teachings of the present invention allow for the heretofore unknown easy, effective and wide-spread use of such sensitive yet important nutrients.

Container 18 may be designed and constructed so as to be rechargeable by a user when depleted. Container 18 may be prepackaged with formula and be disposable when depleted. Container 18 may further be designed and constructed as an appropriate carriage to operably accept a prepackaged refill containing a formula. Either container 18 or a recharging content module for a rechargeable container 18 may be designed and constructed in a unique shape or as having a unique connector, so as to encourage or require charging of device 10 with ingredients supplied by a particular supplier, thereby enhancing usefulness of device 10 in certain commercial contexts. It is appreciated that container 18 may be of any appropriate design and size and may be fabricated of any appropriate non-toxic, non-contaminating inert material.

Alternatively, device 10 may be designed to accept refills from a variety of sources (e.g. through a generic package form or generic refill connector), yet be operable to identify a source, e.g. by use of a barcode reader included with device 10, or by use of a reader able to read an RFID device included in a refill package, or simply by user input specifying the nature of the refill. It will be appreciated that interpretation of barcode or RFID or similar input may provide detailed information as to the contents of the refill, including manufacturer, serial number, concentrations, additives, recommended dilutions, etc., and that such information may be used by device 10 in calculating and controlling food preparation, as will be discussed in detail below.

It is noted that in a preferred embodiment, the avoid the necessity for a manufacturer to maintain two parallel (and costly) production lines, a manufacturer might either design its standard packaging so that it could serve as a refill bag for device 10, or else prepackage a refill bag within its standard package, so that a care-giver using device 10 would install the prepackaged refill in device 10, while other consumers could simply open the package normally and remove the and use the contained product with a spoon. A refill package may alternatively comprise a sterile disposable cartridge into which dry or liquid formula in general-purpose packaging may be poured for automated use within a device 10. Further alternatively, a refill package may comprise a sterile disposable delivery tube attachable to container 18, through which tube formulate from container 18 exits container 18 during use. Use of such a disposable tube reduces or eliminates the need to clean the tube, thereby contributing to the sanitary quality of the delivered food and simplicity of use and maintenance of device 10.

In an alternate preferred embodiment, container 18 is designed to accept, contain, and dispense a dry food such as baby formula embodied in tablet form. Thus, the present invention comprises supplying baby formula or other dry food component in tablet form. For example, a manufacturer might supply 3 gm tablets of baby food with instructions to mix each tablet with 30 ml of water. In an alternative preferred embodiment, container 18 may be equipped to dispense a food component in tablet format, and device 10 may be operable to supply a quantity of heated (optionally sterile) water appropriate for a dispensed number of food tablets. A desired number for food tablets may be input by a user. Still further alternatively, food tablets may be added to a bottle by hand, and a weighing device (such as sensor 43, discussed here-in-below with reference to FIG. 3) may be operable to detect a number of provided tablets by detecting changes in weight of the bottle. Such an embodiment enables a user to operate device 10 by simply by dropping one or several food tablets into a bottle and placing the bottle in device 10, whereupon device 10 would determine by bottle weight the number of tablets thus inserted, and automatically supply an appropriate volume of correctly heated water appropriate for that detected number of tablets. Tablet presentation of baby food and other food concentrates has an additional advantage of simplifying food preparation based on such tablets, with or without use of device 10. Thus users of a tablet-enabled embodiment of device 10 can use tablets in device 10 when they have access to the device, and also use the same tablets for food preparation absent the device, e.g. when traveling.

Device 10 optionally comprises at least one additional container 20 for holding at least one additional ingredient. Because device 10 is preferably a versatile device configured to allow the preparation of a wide variety of fluid foods, different embodiments may have varying numbers of containers 20 for optionally dispensing additional ingredients into the mix of components making up a fluid food. Additional ingredients may be food supplements, flavorings, additional nutritional components, medicaments, or any appropriate additives required by the subject for whom the fluid food is being prepared. It is understood that additional containers 20 and any ingredients that they may contain are not essential features of device 10.

Both containers 18 and 20 have controllable dispensers 22 for dispensing a quantity of formula or the additional ingredient. Each dispenser 22 preferably has a conduit leading from it to the entrance of bottle 26. The conduits are designated 18a and 20a respectively, signifying the container from which they convey the formula or the additional ingredient to bottle 26. Dispenser 22 may be of any type that dispenses the material contained within its respective container and assists in the material's flow through conduits 18a and 20a, respectively, into bottle 26. Dispenser 22 may be a simple butterfly valve or other rotational mechanism that opens and closes by rotating a baffle or other obstruction within an opening, or it may be a pressure application that closes an opening by elastic deformation. Dispenser 22 may allow formula to flow by gravity, or it may be a more complex discharge mechanism with a substance-moving element such as a screw or translating cylinder to mechanically transport the formula, or it may employ a vibrating mechanism to assist the gravitation-aided movement of the formula from dispensers 22 into bottle 26. It is appreciated that different types of dispensers 22 may be required for different types of ingredients depending on the consistency, adhesiveness, viscosity and other characteristics of the ingredient. The specific type of dispenser 22 is not material to the invention. Many such dispensing mechanisms are known for both wet and dry materials and any appropriate dispensing mechanism according to present or future technology may be employed in device 10.

In a preferred embodiment, at least one container 20 and an associated dispenser 22 are designed and constructed to contain and dispense small quantities of food additives, such as, for example, a preparation of the essential fatty acid DHA-ARA. A preferred method for including DHA-ARA in an infant formula is presented hereinbelow in FIG. 7. The method comprises pre-mixing of DHA-ARA with a carrier in such concentration that a portion weighing between 0.5 and 5.0 grams would be appropriate for adding to a preparation of infant formula. According to this preferred embodiment, at least one container 20 and dispenser 22 pair is designed and constructed to be operable to reliably measure and deliver such quantities with acceptable accuracy of measurement.

Containers 18 and 20, and their respective dispensers 22, will preferably be designed and constructed so as to substantially avoid dispensing any of the formula or additional ingredients in such a way that the formula, additional ingredients or remnants thereof come into contact with the controllable water outlets 16 and thereby contaminate them.

Figure 1B:
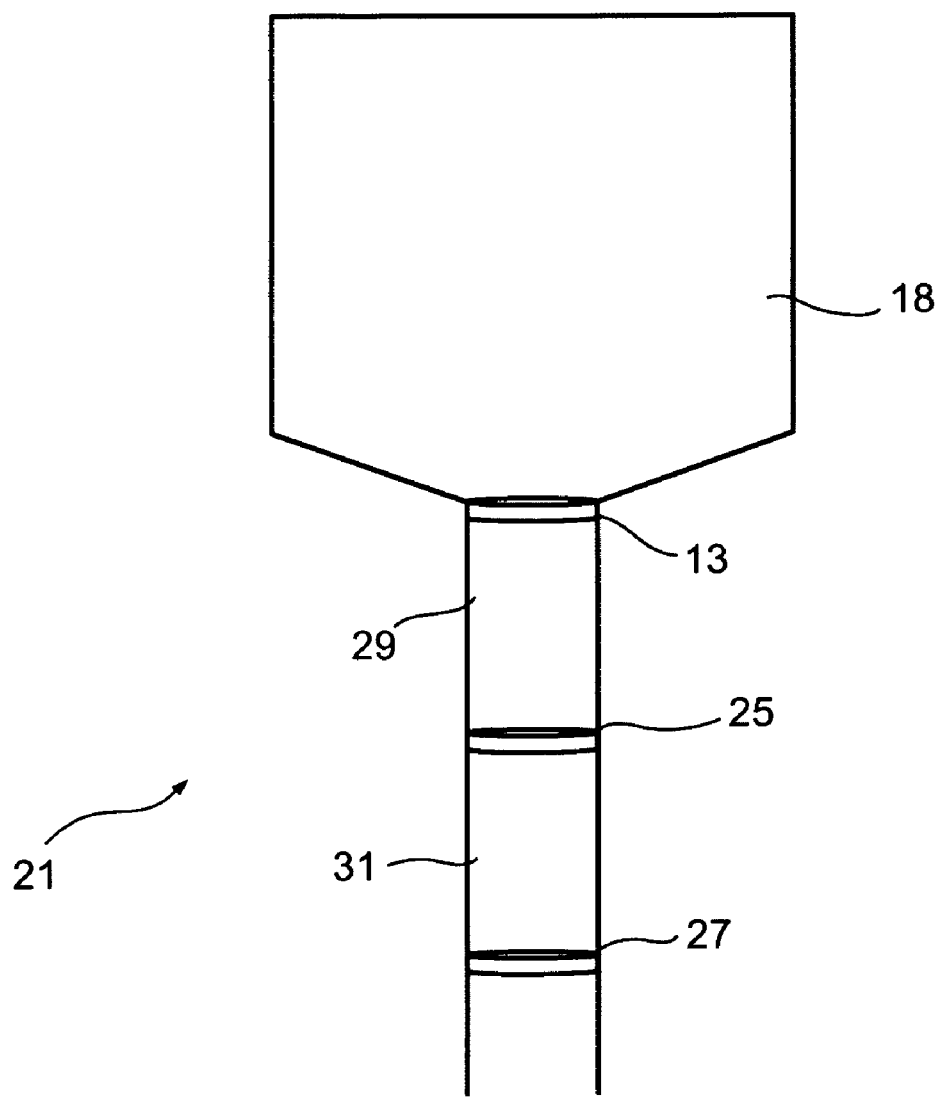

One example of a dispenser 22 designed so as to protect formula in a respective container 18 from contamination is depicted in FIG. 1B. In FIG. 1B, dispenser 22 includes a tube 21 having a first valve 13, a second valve 25 and a third valve 27 dividing tube 21 into a first chamber 29 and a second chamber 31. Each one of the three valves 13, 25 and 27 is configured to be independently toggled between an open and closed state. When necessary a respective controller opens first valve 13. As container 18 is consequently in communication with first chamber 29, formula from container 18 falls into first chamber 29. When a desired amount of formula has entered first chamber 29, first valve 13 is closed and second valve 25 opened. As first chamber 29 is consequently in communication with second chamber 31, formula falls from first chamber 29 into second chamber 31. Second valve 25 is closed and third valve 27 opened. Formula in second chamber 31 falls into vessel 33.

Figure 1B:
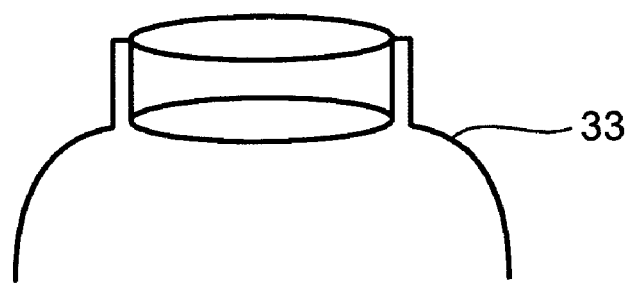

Both outlets 16 and dispensers 22 are preferably designed and configured to affirmatively mix the water with the formula. In this connection, both may be designed to pass the water through the formula on the way into bottle 26, or both may be designed to spray the contents into bottle 26 under pressure and thus effect mixing. Alternatively, base 15 or another portion of device 10 may contain a mixer 80 (shown in FIG. 1), such as a small motor with unbalanced flywheel, designed to agitate bottle 26 to promote mixing of its contents. In general, mixing may be accomplished in different manners or may be simply left to the user to manually agitate bottle 26 after the water, formula and any additional ingredients are dispensed therein.

In order to provide versatility, device 10 is designed and configured for preparing fluid food with a wide range of variation in components, proportions of components and temperature.

For example, different types of water may be used. Tap water or preferably mineral water may be used in the majority of fluid food, whereas some infants and/or adult users, and some formulas, will require demineralized or deionized water. Such water can be purchased commercially or may be prepared by distillation or by passing tap water through a column containing beads of material with an affinity for the ions of the water. Further, the required water may need to be filtered or purified in some manner in order to remove particles or substances present and therefore alternative embodiments of device 10 may preferably contain a filtration, osmosis or deionization device. Many such devices are known and commonly available commercially, such as under sink installations for home use.

An advantage of the present invention is that the use of such "designated" water types can easily be implemented. As is well known, the mineral content of water depends on its source, leading to an undesirable inconsistency in the produced fluid food. When designated water is used it may be commercially advantageous to configure the device to accept only water vessels supplied by a particular water supplier, or only water vessels containing a certain type of water, e.g. de-mineralized water, or water with a selected pre-defined mineral content, or water containing selected additives.

In addition, different types of formula may be required and therefore a range of different ingredients may be needed. Most researchers and authorities agree that breast-fed infants have advantages in terms of general health. They have a more effective immune system and are therefore less sensitive to infections, mental development is faster and they are less fat. Also, there are indications that breast-feeding leads to better health when the infant grows to be a child or adult. For example, breast-fed children are less prone to develop juvenile diabetes, heart diseases and obesity. For further advantages of breast-feeding, the reader is referred to Am. J. Clin. Nutr. 40:635-646, 1984, which is incorporated by reference as if fully set forth herein.

Therefore, formula-producers invest a lot of effort in developing formulas as close as possible in composition to human milk. Such formulas may be based upon cow or goat milk or may be non-milk based such as soy based, provided that they are similar or compatible at least in fat and amino acids composition and content and/or other ingredients to human milk. Many different compositions of each are available on the market. For example, milk-based formulae may include lactose, vegetable oils, skimmed milk powder, whey protein concentrate, sodium, calcium, phosphorus, potassium, chloride, iron, magnesium, taurine, essential fatty acids (such as DHA-ARA), "bio" bacteria and vitamins. Soy based formulae may include glucose syrup, vegetable oils, soy protein isolate, sucrose, maltodextrine, sodium, calcium, phosphorus, potassium, chloride, iron, magnesium, vitamins, methionine, taurine, carnitine, essential fatty acids, "bio" bacteria and trace elements.

In addition to different food formulae, other ingredients may be required in fluid food given to infants, including medicaments, flavorings, and the like, thus further diversifying the mix of ingredients. Most importantly, it is expected that genetic analysis will lead to genetically-based personalized nutrition recommendations for infants as well as adults. Such personalized formulae can easily be designed, prepared, and their usage monitored using the device of the present invention.

In summary, fluid food with an extremely wide range of variations may be prepared with device 10 in order to meet the needs of many consumers. Device 10 carries out the adjustments necessary to achieve these variations automatically. Accordingly, device 10 further comprises a data processor 23 for determining the proportions of the components required to make a required fluid food, for controlling the quantity of the components dispensed and for assuring that the fluid food is served at the desired consumption temperature.

Data processor 23 is preferably a computer including RAM (random access memory) or a functional equivalent which serves as a temporary buffer for data inputs and outputs, and ROM (read only memory) or a functional equivalent that serves for the storage of data and of software programs. Because device 10 may have, in its various embodiments, a wide range of data processing needs, it is understood that the term "computer", as used herein, has a broad definition, ranging from a simple logic circuit for simple comparisons of data to a computing platform with substantial power for making complex calculations. Accordingly, data processor 23 may have any known operating system such as DOS, Windows, OS, Linux; JAVA™-OS or any version of the UNIX operating system such as AIX™ or SOLARIS™ of Sun Microsystems™; or any other known and available operating system.

Data processor 23 carries out several primary functions. A first function is to determine the correct quantity of water from each of reservoirs 12 and 14 needed to mix with the formula in order to achieve a fluid food at the desired consumption temperature on demand. Data processor 23 is operably coupled with thermal sensors within each of reservoirs 12 and 14 and receives thermal records therefrom. Based upon data received from the thermal sensors, the energy of solvation of the formula (if desired), and also, optionally, from input supplied by a user, processor 23 calculates the correct amount of water from reservoir 12 and from reservoir 14, at their current temperatures, that is needed to mix together to achieve the desired consumption temperature of the fluid food to be served. This function is affected via a simple logic circuit which is operably coupled to thermal control circuitry, of which the thermal sensors within reservoirs 12 and 14 form a part, which will be further described with reference to FIG. 3.

Data processor 23 is further operably coupled to a controller 24 that controls outlet 16 such that the correct quantity of water from each of reservoirs 12 and 14 is dispensed and mixed together to form fluid food of the appropriate desired consumption temperature. The temperature of infant fluid food should preferably approximate as closely as possible the normal consumption temperature of nursing, which is preferably between about 25 to about 35 degrees centigrade. It is understood that the desired consumption temperature of other feeding formulas for other purposes may vary as needed and as deemed to be appropriate to use.

A second primary function of data processor 23 is to determine the correct quantity of formula and any other ingredients needed in order to achieve the desired composition of a fluid food. This function is affected based upon user input indicating the nature and composition of the fluid food desired and by programming processor 23 to provide the correct quantities of the appropriate ingredients to create the desired fluid food. Data processor 23 is operably coupled to controller 24 that similarly controls dispensers 22 such that the correct quantities of the appropriate ingredients are dispensed. The above described two functions together serve to mix water of the correct temperature with the correct quantities of the appropriate ingredients to prepare the desired feeding formula at the desired consumption temperature.

It is clear to one skilled in the art, that if it is chosen to include the heat of solvation and/or heat capacity of formula when calculating the temperature of fluid food to be made, the amount of formula added will first be calculated so as to allow accurate calculation of the relative amounts of water dispensed from the reservoirs.

It is appreciated that data processor 23 and controller 24 may be separate components or may be integrated on a single electronic chip. The architecture of the configuration is immaterial so long as data processor 23 and controller 24 are operably coupled together. Moreover, it is immaterial to the invention which dispensing method controller 24 employs to dispense the water from reservoirs 12 and 14 and to dispense the formula and other ingredients from containers 18 and 20.

Figure 3:
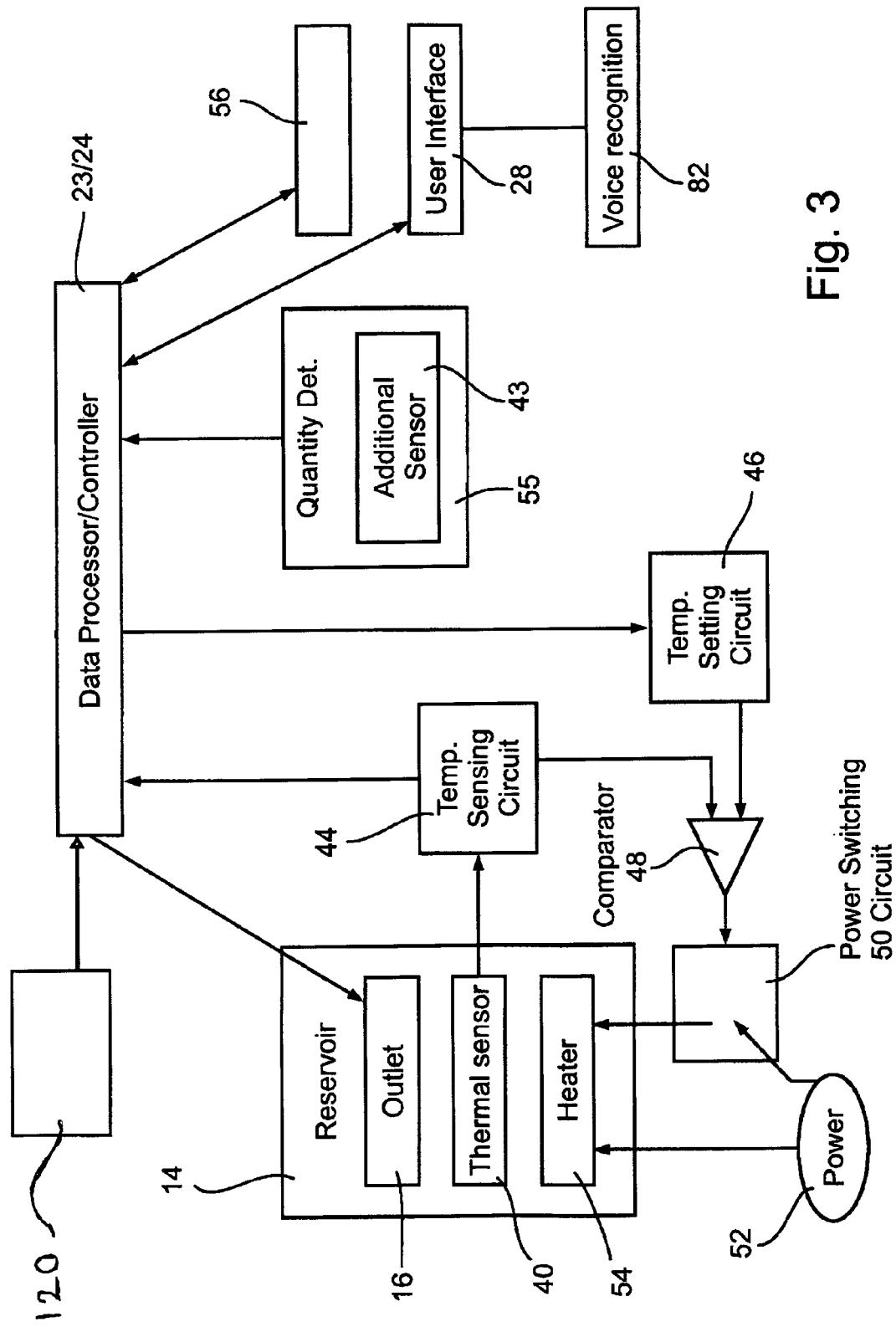
FIG. 3 is a block schematic diagram of a portion of the control circuitry of the device of FIG. 1.

Reference is now made to FIG. 3, which shows a block schematic diagram of a portion of the control circuitry of device 10. A power source, preferably the 110V or 220V AC current commonly in use where device 10 is employed, is shown as power source 52. It is appreciated that device 10 may be configured to operate on any level or type of power, AC or DC and with a range of voltages.

According to the circuitry shown, power flows to power switching circuit 50, which can be a relay or a solid state device, which turns power on and off to heater 54 which is deployed within reservoir 14. It is understood that power also flows to all of the other power-activated elements of device 10 which are not shown in FIG. 3.

Data processor 23 preferably controls the passage of power to heater 54 under two circumstances. The first circumstance is according to the programming of data processor 23 that activates heater 54 preferably every three hours for periodically reboiling the water. It is understood that device 10 also includes reservoir 12, not shown in FIG. 3. Accordingly, data processor 23 activates the heater in reservoir 12 corresponding to heater 54 also preferably every three hours for periodically reboiling the water therein. As mentioned above, in the preferred embodiment, the two heaters are synchronized to alternately periodically operate, such that at any given time, one reservoir has water at a temperature above the desired consumption temperature and the other reservoir has water at a temperature below the desired consumption temperature.

The second circumstance is to assure that the water does not drop to a temperature below a predetermined minimum in between boiling. This second activation is governed by temperature sensing circuit 44 that is coupled to thermal sensor 40. Thermal sensor 40 is preferably a thermistor located within reservoir 14 in a location representative of the average temperature of the water being dispensed. The combination of circuit 44 and sensor 40 essentially forms a thermostat. Other types of thermostats may be substituted. One example of an electronic thermostat is found in U.S. Pat. No. 5,063,836. The thermostat may also be a conventional mechanical circuit. Furthermore, the thermostat and heater 54 may be incorporated into a single unit and placed in the reservoir. An example of such units, commonly used in aquariums, is shown in U.S. Pat. No. 4,142,793.

Data processor 23 is programmed to maintain a minimum temperature within reservoir 14. This temperature parameter is sent as data to temperature setting circuit 46 for use in determining whether power should flow to heater 54.

Comparator circuit 48 receives a signal indicative of the current temperature of water in reservoir 14 from temperature sensing circuit 44 and further receives a signal from temperature setting circuit 46 which is representative of the set minimum temperature. It compares the two signals and provides a logic signal indicating whether the water temperature is above or below the set temperature. An output signal from comparator 48 operates power switching circuit 50. Power switching circuit 50 is closed to provide power to heater 54 when comparator 48 provides a signal indicating that the water temperature is below the minimum temperature indicated by the signal from temperature setting circuit 46.

Temperature sensing circuit 44 also provides a signal indicating the actual water temperature to data processor 23 that in turn provides the signal to user interface 28, not shown but described hereinafter in FIG. 4. The user interface is provided with the circuitry necessary to create the desired output display, which could be a digital LED or LCD readout or an analog dial.

Device 10 may also be configured to provide a final temperature check after all fluid food components have been dispensed into bottle 26. In this regard, device 10 may preferably comprise a secondary heater and circuitry, not shown, as a failsafe measure in order to assure that a fluid food is prepared at the desired consumption temperature. This secondary heater may be a coil, a convector or an infrared heater deployed under or adjacent to bottle 26 in order to administer heat if required after the dispensing of all of the components there into. The circuitry to activate this secondary heater is similar to the circuitry described above with respect to heater 54 but comprises an additional thermal sensor deployed in association with bottle 26 when in its filling position. In this respect, the additional thermal sensor may be on base 15 such that it comes into contact with bottle 26 when bottle 26 is placed thereon for filling, or it may be a submersible sensor that is inserted into bottle 26 during or immediately after filling.

It is a feature of device 10 to provide a versatile array of fluid foods consisting of varying mixes of ingredients. The composition of such fluid foods is programmed into data processor 23 and data processor 23 is operable to cause the dispensing of predetermined quantities of each ingredient needed to prepare each of such fluid foods. Accordingly, device 10 also preferably comprises a quantity detector 55 to serve as a check upon the dispensing in order to assure that the correct quantities of each ingredient have been dispensed into bottle 26. Quantity detector 55 comprises additional sensor 43 which is preferably a weight sensor placed on or under base 15 such that the weight of bottle 26 is monitored when bottle 26 is placed upon it for filling. Many small electronic weight sensors are known in the art and therefore neither further description nor explanation is required.

Data from quantity detector 55 representing the measured quantity is provided to data processor 23 that is operably coupled to controller 24. Based upon a comparison between the predetermined quantity and the measured quantity, data processor 23 will provide a logic signal to controller 24 indicating whether the measured quantity is more or less than the predetermined quantity for that ingredient. If the quantity is less, controller 24 will cause the dispensing of the needed amount of the ingredient in question; if the quantity is more, controller 24 may preferably cause the dispensing of the needed compensatory amounts of the other ingredients in order to preserve the required proportions.

Similarly, quantity detector 55 may be used to determine the quantity remaining in a bottle after feeding in order to prepare the subsequent bottle. This feature is especially useful if the fluid food includes a medicament that must be taken in precise quantities. Any medicament not ingested in an unfinished bottle must be provided in subsequent feedings.

The logic circuitry of quantity detector 55 is not shown but is similar to that employed with respect to the provision of power to heater 54 hereinbefore described.

Data processor 23 may be connected to a product-identifying input device 120 operable to identify component materials supplied to device 10 and/or to specify substance characteristics or preparation instructions with respect to a component material supplied to device 10. Product-identifying input device 120 may be an RFID reader, a barcode reader, or any other input device operable to identify to processor 23 a food component which has been loaded into device 10.

Figure 4:
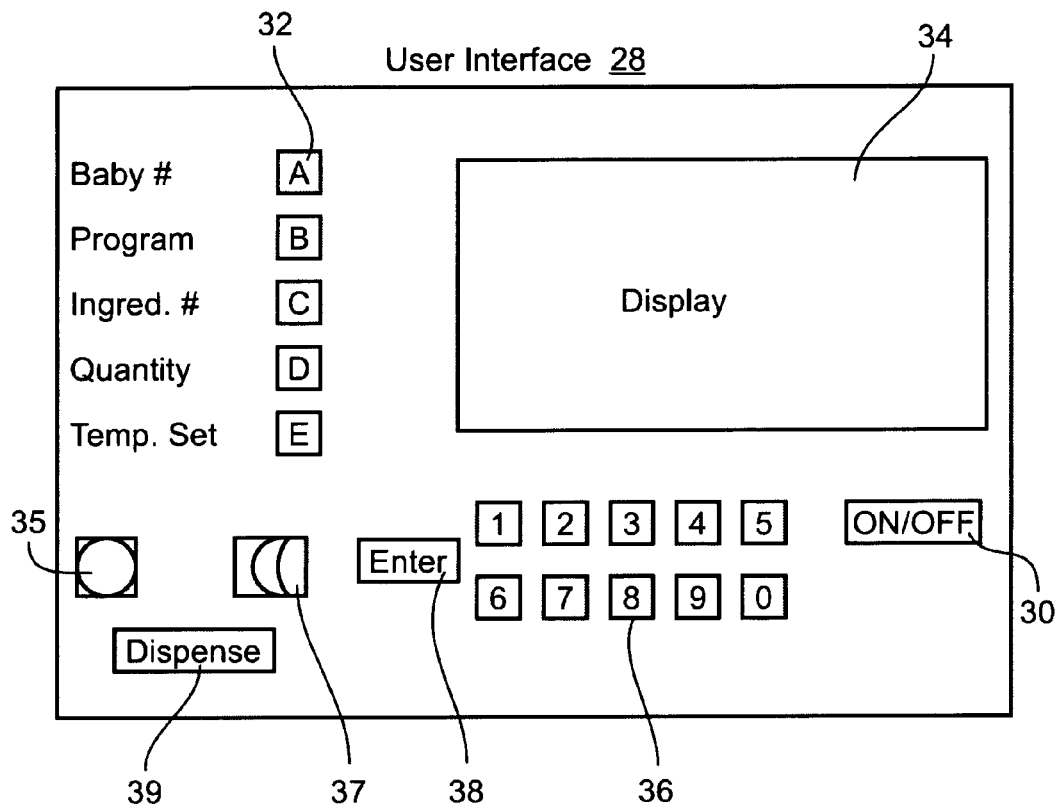
FIG. 4 is a schematic diagram illustrating a preferred embodiment of the user interface of the device of FIG. 1.

Reference is now made to FIG. 4 which is a schematic diagram illustrating a preferred embodiment of user interface 28 of device 10. Device 10 is designed to be programmable and to both provide a user with data and information and also to accept input from a user to decide the composition, quantity and temperature of the fluid food to be prepared.

It is understood that interface 28 depicted is solely exemplary and is so depicted to show representative features that may be included in any interface 28 provided in the various embodiments of which device 10 is capable. Therefore, it is understood that embodiments of device 10 need not have every one of the features and elements shown and may have additional features and elements not shown. Moreover, the features and elements shown may be arranged in any convenient or esthetically pleasing design including being located separately in different locations on housing 11 of device 10.

Interface 28 is preferably disposed upon housing 11 in a location and orientation providing easy access and clear visibility. Interface 28 will preferably have an on/off button or switch 30 permitting a user to provide power and to cut off power to device 10.

Interface 28 preferably includes a visual display 34 that serves as an output interface. Device 10 communicates with a user via display 34 that is preferably an LCD monochrome or color display screen capable of showing text. It is appreciated that alternate embodiments may be capable of showing graphics and still or moving graphic and photographic images. It is further appreciated that future embodiments may have screens of larger or smaller dimensions, capable of displaying more or less or different types of data. Interface 28 may also include an auditory output interface (not shown), such as an integral speaker, for providing audible signals such as alerts, warnings or information regarding certain conditions that prevail, such as low water levels and the like.

Display 34 may also, in alternate embodiments, serve as an input interface and be used for the input of data. According to an alternate embodiment, display 34 could include a touch sensitive digitizer pad that can detect contact by any type of pointer, from a stylus to a simple finger touch. Housing 11 could preferably include an integrally stowed stylus for this purpose. Through such a touch sensitive display 34, interface 28 could input data in a number of different modes. First, it could display a virtual and touch functional keyboard that replicates a standard alphanumeric keyboard. In order to key in data, the user touches display 34 on the desired key of the keyboard and the character of that key appears in the open field. Display 34 could display scrolling or windows-like data menus from which alternatives are selectable by touch. Thus, display 34 could allow entry of data by touch selecting the desired data from displayed lists or menus. Display 34 could serve as a sensor for character recognition that recognizes a tracing and replaces the recognized character with a legible and easily identifiable version in the desired location.

According to a preferred embodiment, the primary input capabilities of interface 28 will be via a plurality of finger-pressable buttons. It is understood that the following description of the use, function and designation of the buttons is solely exemplary and any configuration, combination or marking of buttons that effect the functioning of device 10 may be used. In particular, the following description of buttons for interface 28 is appropriate for infant feeding. Alternate configurations would be more appropriate for adult feeding of various sorts.

Interface 28 includes a plurality of function selection buttons, referred to hereinafter in the aggregate as buttons 32, designated according to function by the letters A through E. Pressing each button with a fingertip or other object will cause the relevant function to be activated. Accordingly, interface 28 will display information or data related to the function selected and will accept input related thereto.

Button A is labeled "Baby #" and is essentially a consumer selector. By pressing button A, a user designates the baby for whom a fluid food is being prepared. When button A is pressed, the identity of a particular baby whose feeding details have been programmed into data processor 23 is displayed on display 34. By repeated presses of button A, successive babies are identified. Such selection is desirable, as individual babies may have individually formulated fluid foods. Such an option is exceptional useful in situations where the device is planned to serve a plurality of individuals, for example in a hospital, a crèche, or in a home with twins, triplets and so forth. Such an option is of critical importance when personalized infant food is required, for example due to medical indications.

With respect to the essential function of identifying the consumer of the food prepared, it is important to note that in applications where there are many users of device 10, such as in hospitals or institutions, measures may be taken to assure that misidentification does not occur. This is particularly true where unique foods not widely tolerable are in use or where medicaments are being administered. In the medical field, almost all information is confidential. Such measures may include secret passwords or personal identification numbers (PIN), or the use of bar coded cards scannable by an infrared port, magnetic cards readable by a reader device, or any other identification methods that may be invented and incorporated within future embodiments of device 10. As such security features are well known in the art; these are not shown nor described herein further.

A user may command device 10 to prepare an already programmed fluid food for a specific baby by simply pressing "dispense" button 39 when that baby's identity is displayed. Device 10 will preferably have the capability to provide full bottles or partial bottles of a fluid food. Accordingly, interface 28 will have input buttons indicating which quantity is desired. Shown in this respect is button 35 marked with a full circle indicating a full bottle and a button 37 marked with a half circle indicating that a half bottle is desired. Alternate embodiments may prepare different fractional quantities and will be appropriately marked or designated.

A user may alternatively revise an already programmed fluid food for a specific baby when that baby's identity is displayed by pressing "program" button B. "Program" button B will cause the parameters of a previously programmed fluid food, including but not necessarily limited to ingredients, quantities and temperature, to be displayed on display 34. Thereafter, buttons C, D and E may be used to respectively display fields in which each of the named parameters appears and may be revised. Specifically, button C will display a field in which each ingredient is listed sequentially. Ingredients may be added or subtracted. Button D will display a field showing the quantities of each ingredient and will allow quantities to be increased or decreased. Button E will display a field with the desired temperature of the fluid food that can be revised upward or downward. During the period that any field is displayed, the listed parameter may be revised by pressing the input buttons, referred to hereinafter in the aggregate as buttons 36, designated according to number by the digits 1 through 0. Pressing each button with a fingertip or other object will cause that digit to be entered into the field and to replace an already entered digit in the field, thereby revising the previous input relevant to that field. For example, if the field displayed was "temperature", displayed due to pressing function button E, thereafter pressing buttons "3" and "4" will enter the temperature 34 degrees in place of the existing temperature displayed in the field. After all of the desired parameters have been displayed and revised as described, pressing "enter" button 38 will program data processor 23 to revise the fluid food for the identified baby accordingly.

A user may alternatively program data processor 23 with a new fluid food for a new baby. The first step is to press button A repeatedly until "new baby" or another designation for a new consumer of food appears in the field. Thereafter, a user enters identity data for the new baby via input buttons 36, and presses "enter" button 38 to record the data entered. Thereafter, the steps previously set forth with respect to revising a feeding formula are carried out. In this circumstance, the fields displayed will be blank and ready to accept new data. When all of the desired data is inputted, the user presses "enter" button 38 to program data processor 23 with the fluid food for the newly identified baby.

It will be appreciated that the number, configuration, location and function of all of the input and output components of interface 28 are not critical elements of the design of user interface 28 nor of device 10 and further embodiments may deploy these components in various ways, including the inclusion of jacks and ports comprising open architecture whereby remote input and output devices may be employed. It will further be appreciated that appropriate changes in user interface 28 may be made to adapt device 10 to use by adults, and for use in hospitals, in geriatric institutions, in restaurants, and in various other contexts.

In a preferred alternative embodiment, a voice recognition module 82 comprising a microphone, processor, and voice recognition software may be used to enable a user to command operation of device 10 by voice commands. Similarly, text-to-speech algorithms or pre-recorded voice messages can be utilized by an aural reporting module for outputting information to a user, the combination of voice recognition module and aural reporting module thereby providing for hands-free and eyes-free control and management of device 10, thereby providing great convenience to a user whose hands and eyes are engaged in handling a baby in need of feeding.

In a controllable optional feature of a preferred embodiment, a combination of scheduling and pattern-recognition software may be provided to respond directly to sounds provided by a baby. For example, such a software module might be programmed to enable device 10 to prepare a bottle of baby formula without waiting for adult intervention if a baby awakens between midnight and 6 am and cries for more than 30 seconds and no food has been prepared by device 10 during some pre-defined preceding length of time. In a similar vein, such a module might provide soothing music in response to such cries, while a bottle is in preparation.

In a preferred embodiment, device 10 comprises a plurality of containers for dry materials and/or liquid materials and/or additives, and may comprise a plurality of water sources of varying composition, enabling device 10 to provide selection from among available ingredients for a given instance of food preparation. Such an embodiment may for example be useful in a commercial context, such as a coin-operated dispenser in a public place, offering a variety of baby formulas or other foods, perhaps a variety of sources of water (mineral water from a selection of commercial sources, de-mineralized water, sterilized tap water), a selection of additives, a selectable range of temperatures, allowing users to pick and choose among a variety of food sources to compose the combination to which their baby is accustomed, or perhaps to experiment with alternatives.

In such a commercial context it may be useful utilize interface 28 to provide commercial messages as well as health recommendations to device 10's clientele. In such a context it may similarly be desirable to identify device 10 as providing a particular commercial product, and to display a trade-mark of that product. Alternatively, it may also be desirable to use device 10 to provide a selection from among a variety of trade-marked products. Interface 28 may further provide means for real-time two-way communication between a user (e.g. a consumer or a care-giver providing for a consumer) and a variety of centrally located supervisory personnel or experts capable of recommending selections or procedures (e.g. a representative of a formula manufacturer or of a supplement manufacturer, a representative of the medical community, etc.)

Multi-baby environments such as child-care centers and multi-patient environments such as hospitals and geriatric care centers are examples of environments wherein embodiment of device 10 comprising a plurality of containers for dry materials and/or liquid materials and/or additives and/or waters of varying composition would be particularly useful. Embodiments adapted to use in such contexts, in addition to enabling selection from among available ingredients for a given instance of food preparation, may also be programmed to produce food based on pre-selected ingredients on a pre-programmed personalized basis. Thus, particular combinations of ingredients, desired temperatures, etc., can be pre-programmed for particular individuals, such that merely specifying the name of a particular child or patient can result in preparation of a food specifically adapted to that consumer's individual health needs and personal taste.

Figure 5:
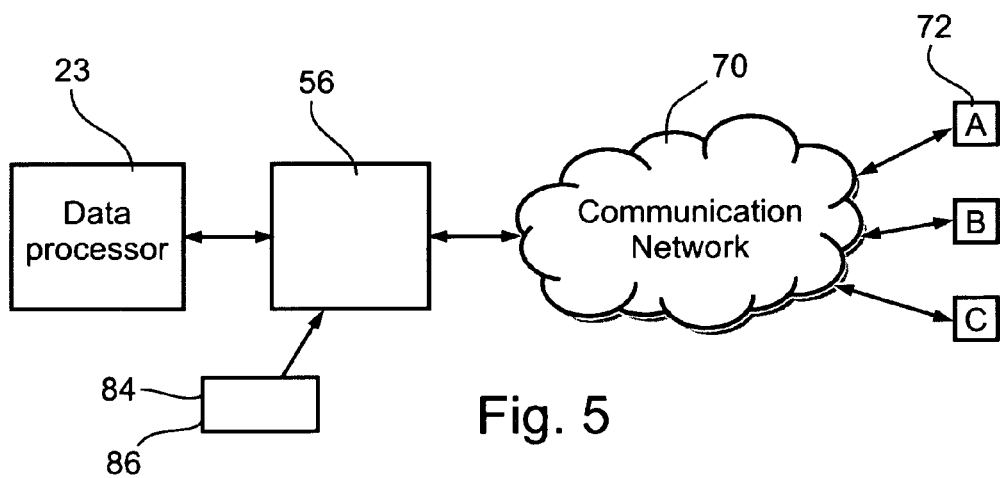
FIG. 5 is a block diagram illustrating the communication of data by the device of FIG. 1 via a communications network.

Reference is now made to FIG. 5, which illustrates the communication of data relating to formulae and/or fluid foods via a communications network. Device 10 is preferably equipped for both sending and receiving data related to formulae and/or fluid foods. Simply described, device 10 will preferably be capable of receiving input from a remote source related to the preparation of a fluid food using an available formula and will similarly be capable of providing user output to a remote source.

Data processor 23 is associated with a communications module 56. Communications module 56 is operable to process, store, and communicate information over a communications network or directly to another communications module. Communications module 56 may effect communication through a communications network 70. The term "communications network" refers to the Internet as manifested by the World Wide Web (WWW) of computers, and to Intranets or Extranets or any other open or closed communications networks, cellular networks such as GSM and GPRS, satellite networks, cable networks and local area networks, either wired or wireless, and any similar kinds of networks.

Communications module 56 is operable to communicate with one or more user clients, referred to hereinafter both individually and collectively as user client 72. As used herein, the term "user client" refers to a device which is communications enabled and which allows a user to communicate with device 10 through communications device 56. Thus user client 72 may be, for example, a computer, a PDA, a telephone, a cellular communication device or a network server. Communications module 56 preferably communicates with a plurality of user clients 72, such as, for example those operated by the baby's physician, a pharmacy, alternate caregivers, the baby's parents, etc. Such user clients 72 are designated A, B and C in FIG. 5. Similarly, communications module 56 is operable to communicate with one or more external biometric sensors or data collection devices 84, such as a scale 86 operable to weigh a consumer and to report his weight to communications module 56 for use in calculating his nutritional requirements, and for health monitoring and long-term record keeping, and for reporting to one of user clients 72.

In a particularly preferred embodiment, user client 72A is a network server designed and constructed to communicate with a plurality of devices 10. Thus, user client 72A might be a server operated by a service bureau which supplies a plurality of devices 10 to users under leasing arrangements, which server 72A communicates with that plurality of devices 10. Information collected by server 72A from devices 10 might include diagnostic information (e.g. amounts of food eaten, feeding times, baby weight) collected for diagnostic purposes, or collected to enable to provide health recommendations to users according to received data, or collected to assist in targeting commercial messages to users (e.g. when baby starts to eat a lot, it might be time to recommend and/or propose to sell solid food). Similarly, communications module 56 may be used to update a central server re amounts of food components used or remaining, thus enabling to manage inventory by supplying or proposing to supply refills when needed Thus, in general, communications module 56 and a communication network arrangement such as that presented in FIG. 5 may be used to facilitate maintenance of a commercial and/or advisory relationship between users of devices 10 and a network of care providers, a commercial service bureau supplying and maintaining a plurality of devices 10, an individual user (e.g. a mother monitoring use of device 10 from a remote location), etc. Module 56 may be used to enhance a commercial relationship between a supplier and user, for example by enabling to modify prices of supplies provided by the supplier as a function of amount or intensity or selections of use by a user. Such an arrangement would enable, for example, to manage a commercial arrangement whereby device usage, registered and reported by device 10, leads to rebates on the cost of supplies sold by supplier to user, thus creating a scaled payback on the parent's "investment" in purchasing device 10, rebates being calculated as a function of total amounts of formula an individual or institutional user consumes.

Module 56 may also be used to provide maintenance information, enabling device 10 to report to a central service bureau if it detects a device malfunction.

Thus, an embodiment such as that described in the preceding paragraph enables a food-component supplier or device 10 supplier such as a service bureau to develop and maintain a high level of Customer Response Management ("CRM") for its customers. Thus, for example, real time input regarding food preparation and actual consumption may alert a manufacturer, in real time, to an unexplained decline in consumption—and hence enable the manufacturer to communicate with the consumer to find out what's going on and to remedy the situation. Similarly, real-time reporting of a decline in actual consumption, implying that a baby or other user doesn't like a particular food, may enable a manufacturer or supplier to suggest alternatives in food components or in preparation methods in a relevant manner, in real time. Thus, a significant level of two-way communication between supplier and user can be established, providing commercial benefit of the former and health and comfort benefit to the latter. Such In yet another preferred embodiment, device 10 is embodied as a multi-user device such as might be provided in a public context such as an airport or a shopping mall or a child-care center. In such a context communications module 56 and/or interface 28 may be used to provide commercial messages.

Accordingly, device 10 is preferably provided with one or more of a range of communication apparatus that allows device 10 to communicate directly through either a hardwire communication mode (e.g., dial-up, LAN, or WAN) or a wireless communication mode (e.g., infrared or radio frequency) or a combination thereof. Device 10 can include a Wi-Fi, BLUETOOTH chip, or any other wireless solution that will enhance its versatility and mobility, allowing it, for example, to access the Internet from a plurality of access points. For purposes of such communication, device 10 preferably includes either or both a wired communications port and a wireless communications port.

It will be appreciated that the list of user client types, the list of devices that constitute a computer and the list of communications networks are not to be regarded as limiting. Further embodiments of device 10 may adopt all emerging technology to communicate in every way and with every device that advances its function. It is noted that since communication module 56 may be used to communication confidential information (e.g. confidential medical information), means for encryption and/or network security are preferably provided.

Figure 6:
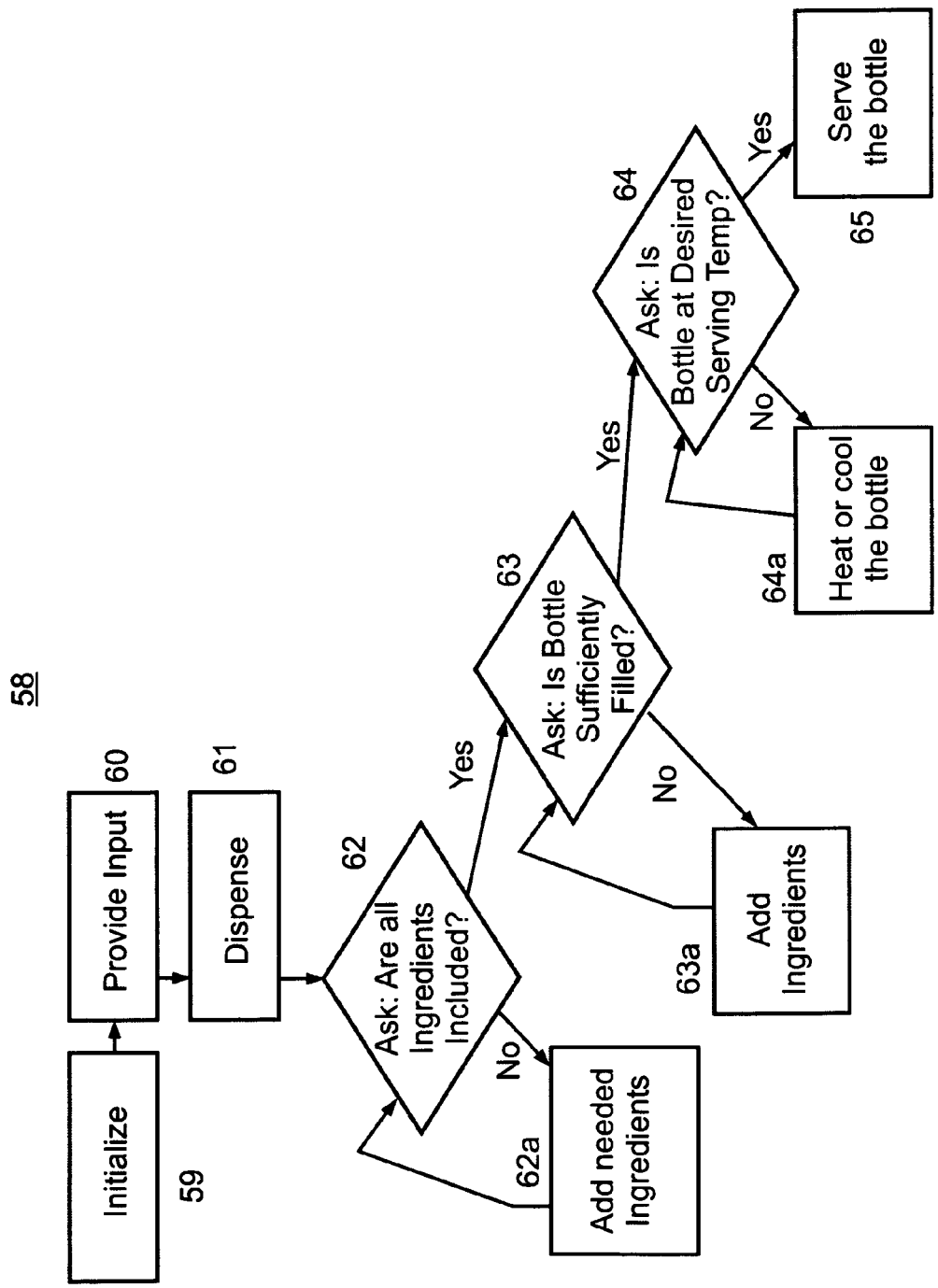
FIG. 6 is a flow chart illustrating a method of preparing a feeding formula in accordance with the present invention.

Reference is now made to FIG. 6 that illustrates a method of preparing a fluid food in accordance with the present invention, hereinafter referred to as method 58. It is understood that method 58 is carried out on device 10 previously described herein, and all of the parts, elements and devices that constitute device 10 are referred to hereinafter by their functional designation, without their previous identifying reference number.

Method 58 begins by step 59, initializing device 10, which includes turning device 10 on by activating an on/off switch or button. This action supplies electricity to device 10 that then begins initiating its functional elements. The data processor measures the quantities of water in each water reservoir and the quantities of ingredients in each container. If the quantities are adequate, it activates the heaters in each water reservoir. If quantities are not adequate, an appropriate alert is provided via the user interface and/or is sent via a communications network to an appropriate user client, prompting the user to replenish all needed quantities. Once all quantities are adequate and the water has been brought to operating temperatures, it can be said that initialization 59 has concluded.

Method 58 then comprises step 60 of providing user input. As described hereinbefore, there are a number of parameters of any fluid food to be prepared, including but not limited to the composition (specific type and nature of the ingredients), the proportions (quantities of each ingredient), the consumption temperature of the fluid food to be served and the quantity of fluid food required. It is the role of the user, either on site via the user interface or remotely via a communications network, to provide the necessary input to instruct the device of the fluid food to be prepared. Instructions so entered may be recorded for subsequent repeated use.

If the user input provided indicates a need for an ingredient not present within the device, an appropriate alert will be provided, prompting the user to add the ingredient.

After all needed informational input is provided and all ingredients are present in appropriate quantities, the device commences step 61, which is to dispense the desired quantity of water from the first reservoir, the desired quantity of water from the second reservoir, formula and any other ingredients needed from their respective containers into a receiving vessel, such as a baby bottle. Such dispensing, including the requirement of a calculation of the temperatures of the water, which is necessary to result in the fluid food being prepared at the desired consumption temperature, has been described hereinbefore.

Thereafter, method 58 preferably includes a number of evaluation steps, including:

Step 62—Determining whether all needed ingredients have been dispensed. The data processor compares the programmed list of ingredients to the actually dispensed ingredients and makes the determination. If all of the ingredients have not been dispensed, step 62a comprises adding the needed ingredients in order to comply with the programmed instructions. If all of the ingredients have been dispensed, a further evaluation takes place.

Step 63—Determining whether the bottle is sufficiently filled. The data processor compares the quantity requested with the quantity provided. The quantity provided is preferably determined by weighing the filled bottle and comparing the weight with programmed data indicating appropriate weight. If the weight is too low, step 63a comprises adding the correct quantity of needed ingredients in order to comply with the programmed instructions. If the weight is too great, indicating that the bottle has been filled more than instructed, an alarm message will appear on the user interface indicating so to the user. When the weight is correct, a further evaluation takes place.

Step 64—Determining whether the prepared fluid food is of the correct temperature. The data processor compares the programmed temperature to the actual current temperature and makes the determination. If the temperature is not correct, step 64a comprises adding water of a higher temperature or water of a lower temperature to respectively heat or cool the formula in order to comply with the programmed instructions. It is understood that adding water will change the concentration of the fluid food. Therefore, an alternative method of heating and cooling is provided. The bottle may be heated by subjecting it to heat produced by the secondary heater described hereinabove, or may be cooled by removing it from the device and bathing with cold water from a tap for a few seconds. When the fluid food is of the desired consumption temperature, the final step may be taken, to the baby's great relief.

Step 65—Serve the bottle to the hungry baby or other consumer.

As can be understood from the relatively short number of steps comprising method 58, the work of preparing a fluid food according to the present invention is largely carried out by an automated device. The advantages of such a method and device are quite substantial, and include the following:

1. The caregiver is relieved of remembering and making the precise fluid food at every feeding. Once the device is programmed, the food is prepared automatically.

2. There is an immediate response. The food is prepared on demand at the desired consumption temperature. The baby need not wait for the correct temperature to be achieved.

3. A precise and error free preparation takes place every time.

4. The food prepared is hygienic. The water and consequently the food prepared therewith is sterile due to periodic reboiling. Similarly, purified or demineralized can easily and economically be used.

5. Dispensing water of the correct temperature does not impair the quality of the food by exposing it to too high a temperature.

6. Foods prepared may be personalized for individual consumers, and such personalized foods may be easily prepared. Conceivably, genetically specified formula can be supplied and easily used.

7. An individual baby's food may be customized or varied easily by the pressing of a few buttons. In this way, additives such as food supplements, medicaments, flavorings, and the like may be added on an as-needed basis.

8. Food, medicament and calorie consumption is accurately tracked. After a portion of liquid food is prepared and consumed, the food remaining is accurately measured. Measurements are preferably recorded for long-term follow-up, and may be communicated as necessary, for example to a health professional.

9. Medicament administration may be tracked. The data processor may retain a record of medicaments added to the fluid food of any baby, as well as the actual quantity of medicament consumed, and the time of consumption.

10. Medicament administration may be compensated. When a food includes a medicament, any unconsumed food may be taken into consideration in preparing the subsequent feeding, in order to assure compliance with a prescribed medicament regimen.

11. Maintenance and cleaning is reduced. A device of the present invention is preferably configured to protect formula and other ingredients used herewith from both ambient humidity, contact with the atmosphere and from contact with water, for example with the use of formula-containing disposable cassettes;

12. A user may remotely provide input via a communications network.

13. Similar to No. 12, a user may receive information relating to the desired food composition from afar, thereby to monitor and oversee the feeding of a baby.

14. Introduction of new formulae containing innovative ingredients is eased as formula manufacturers do not need to redesign existing manufacturing and marketing approaches. Rather such ingredients can be directly offered to those who need or want them. It is anticipated that in coming years genetic analysis will provide a basis for increasingly user-specific feeding and treatment protocols, not only in treatment contexts but for purposes of performance-enhancing nutrition (e.g. sports nutrition, nutrition to enhance energy levels, or memory). Device 10, particularly in its multi-user embodiments, can greatly facilitate fine-tuned user-specific feeding even in institutional contexts.

15. It is known that smaller infants (premature, twins, triplets) need to consume smaller portions of food at shorter intervals, generally need special formulae, medicine or additives, and are more finicky with respect to food. The present invention allows such infants to be easily fed, and minimizes stress to the caretaker which would otherwise be caused by frequent and/or multiple feedings.

16. Formula is stored in a sealed/protective container, consequently is well preserved over time and has little tendency to degrade.

There are many uses for the present invention. The first and most obvious is private home use. Parents will be substantially relieved by using the present device and method to feed their baby, particularly in the middle of the night. For traveling parents, a portable version of a home use device may be smaller and configured to fit into an automobile and to work on 12V DC current.

Institutions that care for multiple babies will find the device to be a great labor saver. In such a context, if the device is large enough to prepare the requisite quantity and variety of portions required, then precise, personalized and hands-free top-quality feeding can be assured for each baby, and feeding records showing each baby's consumption, daily and over a period of time, can be recorded and made available to parents.

Although examples presented hereinabove have depicted a device of the present invention with only one formula container, in some embodiments a device of the present invention includes two or more formula containers, preferably each formula container containing a different formula. In such an embodiment, the associated control system is configured to dispense an appropriate amount of formula from each one of the two or more containers.

Although the present invention has largely been described above in the context of the feeding of human infants, it is clear that the teachings of the present invention are applicable also to the feeding of adults, especially ill and the very old, and to the feeding of non-human animals, in a veterinary, agricultural or animal-care context.

The device may be configured for geriatric feeding simply by providing appropriate food ingredients, and therefore may prove useful in senior citizen homes or geriatric care facilities. The device and method may be used in hospitals and institutions for providing specific liquid diets for those unable to ingest or digest solid foods. Enteral feeding formulas may also be prepared.

It is not difficult to imagine that such a device, dispensing a generic or popular feeding formula, could be made available in public places for the use of the public who may have a need, such as at airports, shopping centers and the like. Such devices could be configured as vending machines. In a preferred commercial embodiment of the present invention, a dispenser of baby formula may thus be provided in a public place and identified with a trade mark of a known commercial formula manufacturer or other know supplier of baby products. Formula may then be supplied for payment in a vending-machine format, thereby supplying a convenient source of sterile baby formula on demand and from a trusted source (the known supplier), which supply could be a great convenience for users in a variety of contexts. Alternatively, such a supply source might be provided for free in such a public context, as a highly convincing advertising method: such a presentation of free (or inexpensive), sterile, appropriately-heated instantly-ready baby food in a public context could serve as a powerful advertisement for the commercial entity (formula manufacturer, baby equipment supplier, etc.) whose trade mark is associated with (.e.g. displayed on) the dispenser. Additionally, such a public presentation of the device could serve as a powerful demonstration and advertisement for the device itself.

In a preferred mode of commercialization, home dispensers might be leased or lent to clients during the period of their need together with a contract for supply of formula and/or maintenance of device 10 during that period. Appropriate messages from supplier to user, delivered through interface 28 of device 10 and possibly selected based on analysis of usage information gleaned through interface 28, can then serve to develop a personalized relationship between supplier and client, which relationship would then present opportunities for the supplier to offer additional appropriate materials and services (e.g. bottles, diapers, early solid food) for the growing baby.

With respect to specialized feeding, whether of infants or of adults, embodiments of the present invention are particularly appropriate for monitoring individuals' eating and keeping records of their nutrition-related activities, and for preparing food supplements appropriate for their specific needs. Data processor 23 and controller 24, communications module 56, and interface 28, may be designed and programmed to enable collection of a variety of information concerning the nutritional needs of humans in general, the nutritional needs of an individual consumer, the recent food intake of that consumer, recent and planned activities of that consumer, and biometric descriptions of that consumer (his current weight, for example). Such collected information may then be algorithmically analyzed to determine a selection of foods and/or food supplements appropriate for that individual at a particular time. Alternatively, human advice and recommendations based on this information may be obtained by remote communication with a human advisor, as discussed above. Such recommendations can be provided as a communication to a user through communication module 56 and interface 28, or may be provided through communication module 56 directly to processor/controller 23/24 and thus to device 10. Device 10, having thus determined such a selection of foods and/or food supplements, may then prepare a food portion appropriate to that individual.

In a preferred embodiment of the present invention, device 10 will accept input, for each of a plurality of individual consumers, regarding type and quantity of nutrition consumed nutritional targets for the individual, performed or planned physical activity. Device 10 will then analyze any differences between target requirements for essential nutrients and actual amounts of those essential nutrients consumed by the individual, compute to determine a selection of measured quantities of essential nutrients required to complement or complete the desired nutritional intake for that individual, and prepare a mixture including those selected nutrients in those selected quantities. Optionally, device 10 may add selected flavorings or other foods or additives according to direct commands or recorded preferences of the individual consumer. In a preferred embodiment, device 10 is further operable to calculate and provide a nutritional report based on the independent food consumption reported by the individual, to report on the composition of the complementary mixture prepared (and, optionally, by weighing the remnants after consumption, to report the amounts actually consumed), and to report summaries showing consumption and consumption trends over time. Such reports may be made on device 10's user interface 28, or, through communications module 56, on the consumer's PC or cellular telephone or other computing or communications device, or on a communication device of a health provider such as a physician or dietician. Reports may also be made concerning quantities remaining of various components, to facilitate resupply.

Thus, device 10 can be used to implement a personal nutrition guidance program utilizing personalized complementary personal nutrition supplements. So utilized, device 10 provides means for recording one's daily food consumption, daily activities relevant to nutrition (such as exercise), and for preparing a personalized food portion and/or food supplement in response to that recorded information. Information regarding food consumption may be typed into a keyboard, or registered through hand-held or PC-based bar-code readers or other devices operable to read the RFI identity of a food product. Nutritional goals whose achievement can thus be facilitated include physician's or other health provider's recommendations, nutritional and supplement recommendations based on personal genetic analysis (nutrigenomics), weight control both for excessively fat or excessively thin or weak persons, general health goals of appropriately balancing intake of fat, proteins, carbohydrates, fibers, supplements, vitamins, minerals, and trace elements, energy intake (for athletes), body-mass (for body builders and athletes), etc.

Device 10 also provides a means for well-governed and well monitored taking of medications, providing a safe, convenient and recordable way to take medication with food. This useful possibility is particularly important for the elderly or chronically ill, but may rapidly become useful to the general public, in that, with the expected advances in development of "nutraceuticals", nutrition designed to enhance traits such as increased concentration, strengthened memory, and similar personal enhancements may rapidly become popular.

Complementary nutrition is of course useful for infants as well as for adults. From the age of approximately 6 months, infants' diets are not limited to milk (mothers or industrial). From that time one, it is beneficial for the infant's formula to be adjusted to the infant's total nutrition sources, as described above.

Device 10 is preferably also programmable to supply prepared food portions according to each individual's personal taste. Selection of taste additives and flavorings, selection of temperature of the product, and proportions of various components may be chosen by an individual user, remembered by device 10, and reproduced as appropriate during future iterations of food preparation for that individual.

Adaptation of food preparation to nutritional requirements of an individual and adaptation of food preparation to taste and personal preferences of an individual may of course be combined, or, in alternative embodiments, be embodied separately. Examples of contexts for which device 10 would be useful when used primarily as a nutritional control device include preparation of special foods and food supplements for the sick, the elderly, the very young, and for persons with special dietary requirements such as intensive sport training or body-building regimens. An example of a context from which device 10 would be useful when used primarily as a device for providing personalized food or drink selections based on personal preferences of individual consumers include a hot-drink dispenser programmed to deliver hot drinks of various sorts at selected concentrations and at selected temperatures, enabling each individual in, for example, a home or office context, to receive the drink of his choice, with combined ingredients of his choice, at concentrations of his choice and at a temperature of his choice, at the push of a button. A coffee machine operable to provide personalized coffee preparation is an example.

Figure 7:
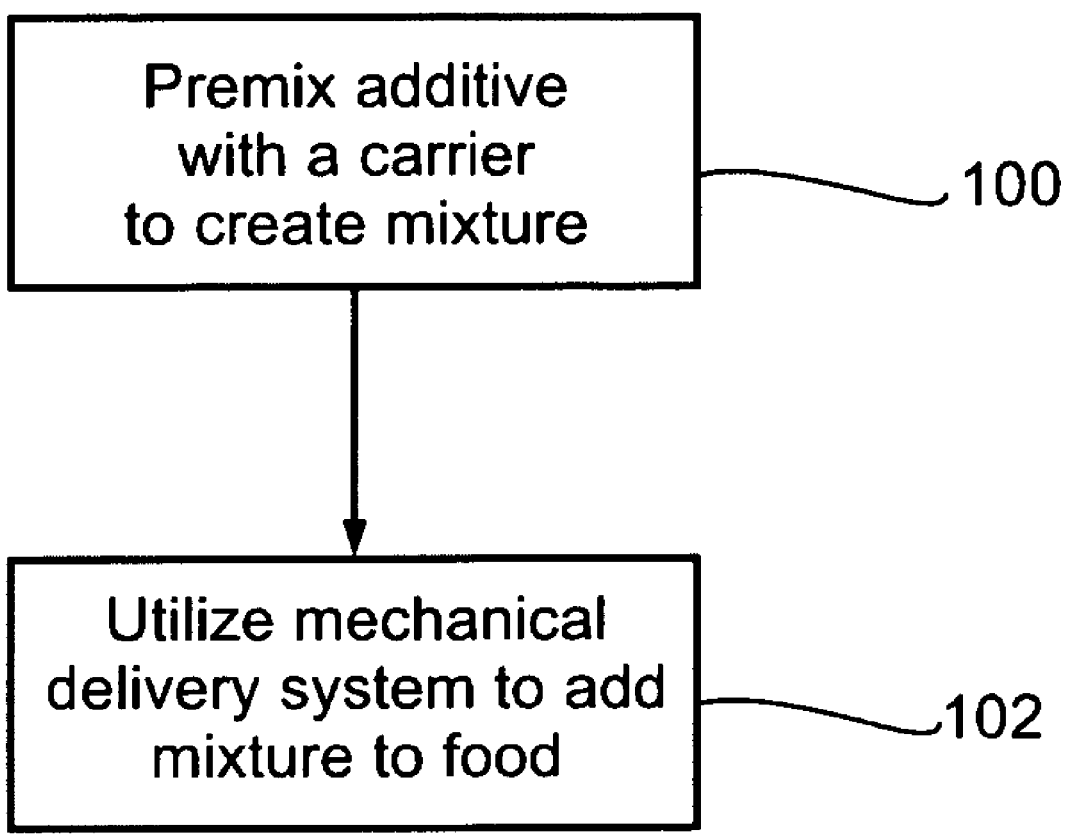
FIG. 7 is a simplified flow chart illustrating a method of preparing a food containing a very small quantity of a food additive, according to an embodiment of the present invention.

Attention is now drawn to FIG. 7, which is a simplified flow chart of a method for preparing a food containing a small quantity of a food additive, said small quantity being inferior to 0.01 grams per dose. At step 100, an additive is pre-mixed with a carrier to produce an additive mix. In producing additive mix, additive is mixed with carrier in such proportion that a desired dose of additive, per portion of food, is contained in between 0.5 gram and 5 gram of additive mix. At step 102, a mechanical delivery system such as device 10 is used to add a selected quantity of additive mix, preferably between 0.5 grams and 5 grams of the additive mix, to a prepared food.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any suitable subcombination.

Although the present invention has been largely described in the context of the feeding of human infants, it is clear that the teachings of the present invention are applicable also to the feeding of adults, to genetically-tailored feeding, to feeding of the ill and the very old, and to the feeding of non-human animals, in a veterinary, agricultural or animal-care context.

It will be appreciated by persons skilled in the art that the present invention is not limited to what has been particularly shown and described hereinabove. Rather, the scope of the present invention is defined by the appended claims and includes both combinations and sub combinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the claims.

What is claimed is:

1. A method of marketing food comprising:
(a) providing a fluid-food preparation device in a location, said device being operable to prepare a sterile liquid food by combining at least one dry food component with water sterilized by boiling within said device, and serving said combination accurately heated to a predetermined temperature, and wherein said device comprises:
   (i) a first water reservoir which comprises a first controllable water outlet, a first heater operable to heat water in said first reservoir and a first thermal sensor operable to report temperature of water contained in said first reservoir;
   (ii) a second water reservoir which comprises a second controllable water outlet, a second heater operable to heat water in said second reservoir and a second thermal sensor operable to report temperature of water contained in said second reservoir
   (iii) a first container for holding a dry food component, said first container having a first controllable dispenser for dispensing said dry food component;

(iv) a data-processor/controller operable to receive water temperature data from said first and second thermal sensors, further operable to calculate a quantity of water from each of said first and second reservoirs needed to mix with a quantity of said formula in order to prepare said fluid food at said predetermined temperature, and further operable to control operation of said first and second controllable water outlets so as to dispense said calculated quantities of water for mixing with said quantity of dry food component;

(b) identifying said device as being associated with at least one mark, said mark associated with a manufacturer of at least one component of said combination;

(c) introducing in a dispenser of said device a food component associated with said food component manufacturer; and (d) providing a customer with fluid food made by said device, the method characterized in that (e) said data-processor/controller is further configured to command alternating periodic heating of water in said first and second reservoirs to sterilization temperatures, thereby periodically re-boiling said water; and (f) said data-processor/controller is further configured to command heating of water in said first reservoir only when water in said second reservoir is below said predetermined temperature, and to command heating of water in said second reservoir only when water in said first reservoir is below said predetermined temperature, thereby enabling periodic re-boiling of water both in said first and in said second reservoirs, while also enabling use of said device for preparation of said food at said predetermined temperature by mixing said formula with selected amounts of water from said first and second reservoirs during all phases of said periodic re-boiling.

2. The method of claim 1, wherein said manufacturer is a manufacturer of a product selected from a group consisting of infant food formula, geriatric food formula, sports-food formula, and bottled water.

3. The method of claim 1, further comprising providing a data-collection module in said device, collecting data from a user, and providing a service selected from a group consisting of making a recommendation based on said data and of combining said components in amounts calculated according to said data.

4. The method of claim 1, wherein said first container is designed and constructed to be rechargeable with a food component package having a specialized form and sold by said manufacturer associated with said at least one mark, and wherein said device comprises fittings for accepting only said specialized form of food component package, thereby limiting food component packages useable with said device to those having said specialized form.

5. The method of claim 1, wherein said first container is designed and constructed as a food component package having a specialized form and sold by said manufacturer associated with said at least one mark, said package being disposable when depleted, and wherein said device is designed and constructed to operably accept therein said food component package as said first container.

6. The method of claim 1, further comprising providing a processor and a communication module in said device and using said processor and said communication module to communicate information related to operation of said device via a communication network.

7. The method of claim 1, wherein said device further comprises a weight sensor operable to weigh a recipient for said fluid food before and after filling of said recipient.

8. The method of claim 7, further comprising calculating and recording amounts of food consumed by a user by subtracting, from a recorded weight of a recipient containing freshly prepared food, a detected weight of said food-containing recipient subsequent to food consumption by said user.

9. The method of claim 1, further comprising providing a plurality of said devices in a plurality of locations, providing each of said devices with a processor and a communications module, providing a central server operated by a service bureau and operable to communicate with each of said plurality of devices, and periodically establishing communication between said server and said devices.

10. The method of claim 9, wherein said devices are operable to communicate device usage information to said service bureau by means of said processors and communications modules, and said method further comprises use of said information by said service bureau for management of customer relations between said bureau and a plurality of users of said plurality of devices.

11. The method of claim 9, wherein said devices are operable to communicate device usage information to said service bureau by means of said processors and communications modules, and said method further comprises utilizing said communicated device usage information in management of re-supply of said components to said plurality of devices.

12. The method of claim 9, wherein each of said devices further comprises a user interface operable to receive input from a user and further operable to communicate a message from said bureau to said user, said method further comprises transmitting from said service bureau to at least one of said devices a message selected from a group consisting of a baby-care recommendation, a patient-care recommendation, a publicity statement, a public service announcement, and a sales offer.

13. The method of claim 12, wherein said interface comprises an element useable by a user to indicate that said user wishes to order re-supply of a food component by said service bureau.

14. The method of claim 12, further comprising selecting a sales message for transmission from said service bureau to a user through a communication module of one of said devices, wherein said selection of said sales message is at least partially dependent on device usage data transmitted from said one of said devices to said service bureau.

* * * * *